United States Patent
Nalci et al.

(10) Patent No.: US 12,368,889 B2
(45) Date of Patent: Jul. 22, 2025

(54) COEFFICIENT-BASED TRANSFORM AND MODE SIGNALING

(71) Applicant: Apple Inc., Cupertino, CA (US)

(72) Inventors: Alican Nalci, Cupertino, CA (US); Yunfei Zheng, Santa Clara, CA (US); Hilmi E. Egilmez, Santa Clara, CA (US); Yeqing Wu, Cupertino, CA (US); Yixin Du, Cupertino, CA (US); Alexandros Tourapis, Los Gatos, CA (US); Jun Xin, San Jose, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 70 days.

(21) Appl. No.: 18/312,077

(22) Filed: May 4, 2023

(65) Prior Publication Data
US 2024/0040151 A1    Feb. 1, 2024

Related U.S. Application Data

(60) Provisional application No. 63/392,943, filed on Jul. 28, 2022.

(51) Int. Cl.
*H04N 19/13* (2014.01)
*H04N 19/124* (2014.01)
(Continued)

(52) U.S. Cl.
CPC ........... *H04N 19/60* (2014.11); *H04N 19/124* (2014.11); *H04N 19/172* (2014.11); *H04N 19/18* (2014.11)

(58) Field of Classification Search
CPC .... H04N 19/60; H04N 19/124; H04N 19/172; H04N 19/18; H04N 19/176; H04N 19/12; H04N 19/70
See application file for complete search history.

(56) References Cited

U.S. PATENT DOCUMENTS 9,191,670 B2 * 11/2015 Karczewicz ........... H04N 19/70
9,565,404 B2 *  2/2017 Su ........................ H04N 19/17
(Continued)

FOREIGN PATENT DOCUMENTS

EP    1478190    * 11/2004    ............... H04N 7/50
GB    2503875    *  6/2012    ............ H04N 19/103
(Continued)

OTHER PUBLICATIONS

ITU-T; Versatile Video Coding (Year: 2022).*
(Continued)

*Primary Examiner* — Philip P. Dang
(74) *Attorney, Agent, or Firm* — BakerHostetler

(57) ABSTRACT

Techniques are described for express and implied signaling of transform mode selections in video coding. Information derived from coefficient samples in a given transform unit (TU) or prediction unit (PU) may constrain or modify signaling of certain syntax elements at the coding block (CB), TU, or PU levels. For instance, based on the spatial locations of decoded coefficients, the spatial patterns of coefficients, or the correlation with the coefficients in neighboring blocks, various syntax elements such as the transform type and related flags/indices or secondary transform modes/flags indices, a residual coding mode, intra and inter prediction modes, and scanning order may be disabled or constrained. In another case, if the coefficient samples match a desired spatial pattern or have other desired properties then a default transform type, a default secondary transform type, a default intra and inter prediction mode or other block level modes may be inferred at the decoder side. Similar ideas may be extended to infer intra-block copy (IBC) flags/modes/indices from coefficient samples, or to infer flags and modes related to predictive coding techniques such as blockwise differential pulse code modulation (BDPCM), i.e., (Continued)

horizontal and vertical BDPCM modes, palette mode syntax and other block level flags/indices.

19 Claims, 15 Drawing Sheets

(51) Int. Cl.
   *H04N 19/172* (2014.01)
   *H04N 19/18* (2014.01)
   *H04N 19/60* (2014.01)
   *H04N 19/70* (2014.01)

(56) References Cited

U.S. PATENT DOCUMENTS

| | | | | |
|---|---|---|---|---|
| 10,638,147 | B2* | 4/2020 | Hu | H04N 19/44 |
| 10,757,428 | B2* | 8/2020 | Guo | H04N 19/136 |
| 10,798,390 | B2* | 10/2020 | Filippov | H04N 19/176 |
| 10,917,637 | B2* | 2/2021 | Yoo | H04N 19/103 |
| 11,184,636 | B2* | 11/2021 | Aono | H04N 19/563 |
| 11,582,455 | B2* | 2/2023 | Filippov | H04N 19/176 |
| 11,632,546 | B2* | 4/2023 | Bang | H04N 19/186 |
| | | | | 375/240.12 |
| 11,677,950 | B2* | 6/2023 | Schwarz | H04N 19/1887 |
| | | | | 375/240.02 |
| 11,882,284 | B2* | 1/2024 | Siekmann | H04N 19/157 |
| 11,956,469 | B2* | 4/2024 | Chiang | H04N 19/60 |
| 11,973,983 | B2* | 4/2024 | Karczewicz | H04N 19/103 |
| 11,991,393 | B2* | 5/2024 | Chiang | H04N 19/122 |
| 12,126,794 | B2* | 10/2024 | Peringassery Krishnan | |
| | | | | H04N 19/107 |
| 2014/0003530 | A1* | 1/2014 | Sole Rojals | H04N 19/61 |
| | | | | 375/240.18 |
| 2016/0234499 | A1* | 8/2016 | Chuang | H04N 19/61 |
| 2017/0064298 | A1* | 3/2017 | He | H04N 19/176 |
| 2017/0094274 | A1* | 3/2017 | Chien | H04N 19/159 |
| 2018/0352225 | A1* | 12/2018 | Guo | H04N 19/186 |
| 2021/0084301 | A1* | 3/2021 | Siekmann | H04N 19/176 |
| 2021/0112279 | A1* | 4/2021 | Karczewicz | H04N 19/176 |
| 2022/0046253 | A1* | 2/2022 | Zhang | H04N 19/96 |
| 2022/0248031 | A1* | 8/2022 | Ma | H04N 19/577 |
| 2023/0085680 | A1* | 3/2023 | Chujoh | H04N 19/52 |
| | | | | 375/240.16 |

FOREIGN PATENT DOCUMENTS

| | | | | |
|---|---|---|---|---|
| WO | WO-2014082088 | A1* | 5/2014 | H04N 19/117 |
| WO | WO 2019/083583 | A1 | 5/2019 | |
| WO | WO 2019/152570 | A1 | 8/2019 | |
| WO | WO 2022/072062 | A1 | 4/2022 | |

OTHER PUBLICATIONS

International Patent Application No. PCT/US2023/070989; Int'l Search Report and the Written Opinion; dated Jan. 8, 2024; 19 pages.

U.S. Appl. No. 18/076,166, filed Dec. 6, 2022.

Chen et al.; "Algorithm description for Versatile Video Coding and Test Model 12 (VTM 12)"; Document JVET-U2002-v1; Jan. 2021; 101 pages.

Lee et al.; "Improved Lossless Intra Coding for H.264/MPEG-4 AVC"; IEEE Transactions on Image Processing; vol. 15 No. 9; Sep. 2006; p. 2610-2615.

Nalci et al.; "Forward Skip Coding for Prediction Residuals"; Alliance for Open Media, Codec Working Group; Document CWG-C002-v2; Jan. 2022; 16 pages.

Schwarz et al.; "Improved Quantization and Transform Coefficient Coding for the Emerging Versatile Video Coding (VVC) Standard"; IEEE Int'l Conf. on Image Processing; 2019; p. 1183-1187.

Browne et al.; "Algorithm description for Versatile Video Coding and Test Model 16 (VTM 16)"; Document JVET-Y2002-v1; Jan. 2022; 126 pages.

International Patent Application No. PCT/US2023/070989; Int'l Preliminary Report on Patentability; dated Feb. 6, 2025; 14 pages.

\* cited by examiner

100

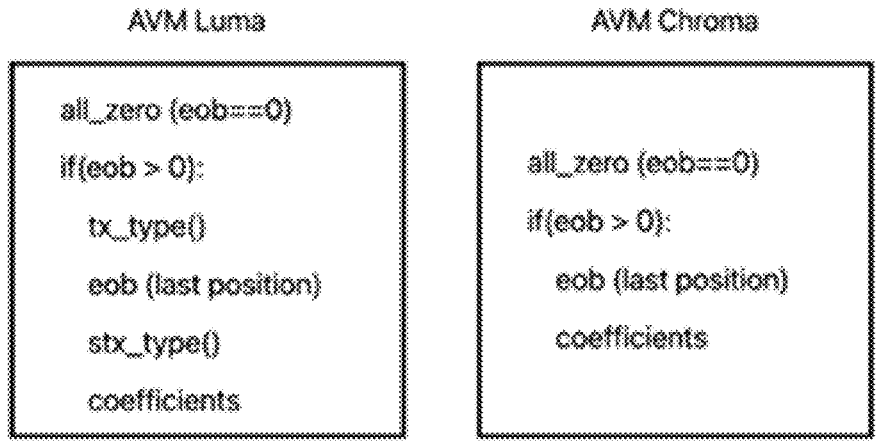
FIG. 2
200
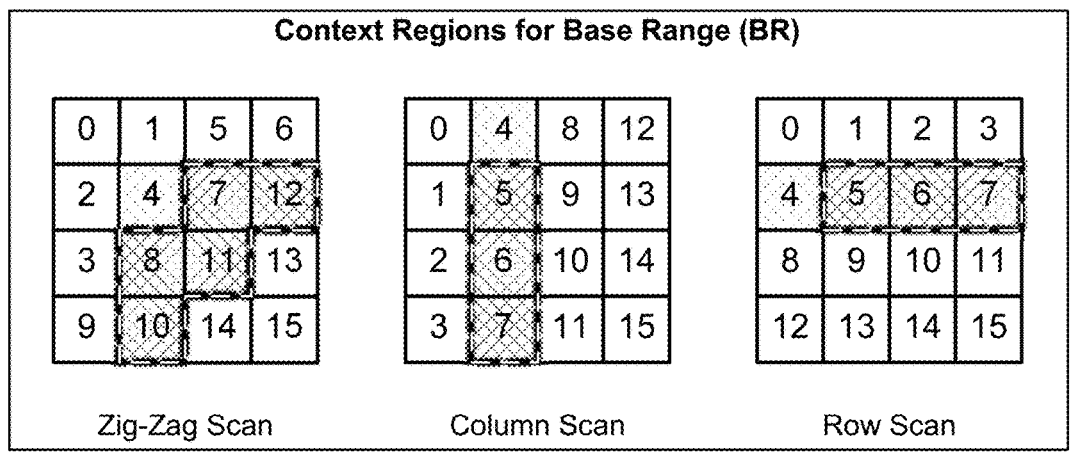
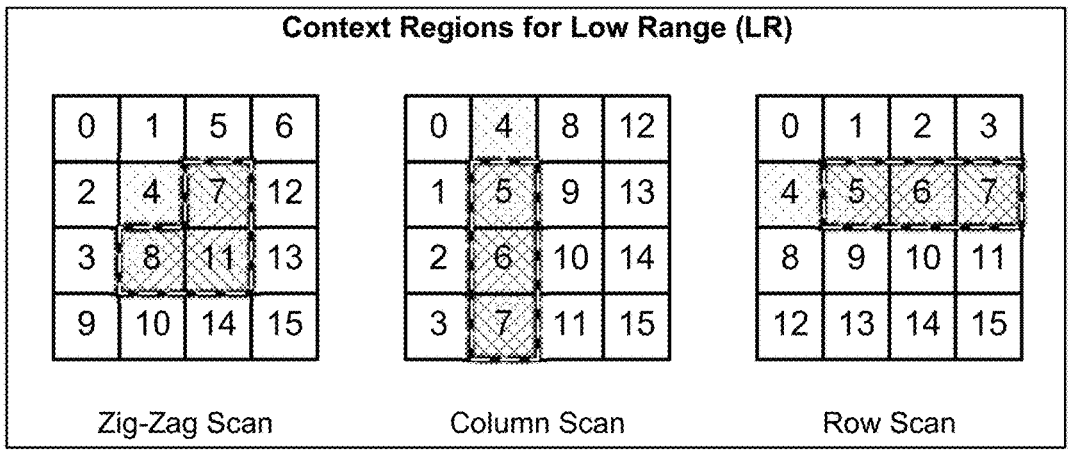
FIG. 3
300

FIG. 5
500

8x8 TU with EOB=0+1

| 0 | 2 | 3 | 9 | 10 | 20 | 21 | 35 |
|---|---|---|---|---|---|---|---|
| 1 | 4 | 8 | 11 | 19 | 22 | 34 | 36 |
| 5 | 7 | 12 | 18 | 23 | 33 | 37 | 48 |
| 6 | 13 | 17 | 24 | 32 | 38 | 47 | 49 |
| 14 | 16 | 25 | 31 | 39 | 46 | 50 | 57 |
| 15 | 26 | 30 | 40 | 45 | 51 | 56 | 58 |
| 27 | 29 | 41 | 44 | 52 | 55 | 59 | 62 |
| 28 | 42 | 43 | 53 | 54 | 60 | 61 | 63 |

(a)

8x8 TU with EOB=2+1

| 0 | 2 | 3 | 9 | 10 | 20 | 21 | 35 |
|---|---|---|---|---|---|---|---|
| 1 | 4 | 8 | 11 | 19 | 22 | 34 | 36 |
| 5 | 7 | 12 | 18 | 23 | 33 | 37 | 48 |
| 6 | 13 | 17 | 24 | 32 | 38 | 47 | 49 |
| 14 | 16 | 25 | 31 | 39 | 46 | 50 | 57 |
| 15 | 26 | 30 | 40 | 45 | 51 | 56 | 58 |
| 27 | 29 | 41 | 44 | 52 | 55 | 59 | 62 |
| 28 | 42 | 43 | 53 | 54 | 60 | 61 | 63 |

(b)

8x8 TU with EOB=62+1

| 0 | 2 | 3 | 9 | 10 | 20 | 21 | 35 |
|---|---|---|---|---|---|---|---|
| 1 | 4 | 8 | 11 | 19 | 22 | 34 | 36 |
| 5 | 7 | 12 | 18 | 23 | 33 | 37 | 48 |
| 6 | 13 | 17 | 24 | 32 | 38 | 47 | 49 |
| 14 | 16 | 25 | 31 | 39 | 46 | 50 | 57 |
| 15 | 26 | 30 | 40 | 45 | 51 | 56 | 58 |
| 27 | 29 | 41 | 44 | 52 | 55 | 59 | 62 |
| 28 | 42 | 43 | 53 | 54 | 60 | 61 | 63 |

```
┌─────────────────────────────────────────────────────────┐
│ CODE A TRANSFORM UNIT OF A VIDEO FRAME BY               │
│ TRANSFORMING CONTENT OF THE TRANSFORM UNIT FROM A       │──── 1402
│ PIXEL DOMAIN TO A TRANSFORM DOMAIN AND QUANTIZING       │
│ TRANSFORM COEFFICIENTS OBTAINED BY A QUANTIZATION       │
│ PARAMETER                                               │
└─────────────────────────────────────────────────────────┘
                            │
                            ▼
┌─────────────────────────────────────────────────────────┐
│ DETERMINE A PATTERN OF QUANTIZED TRANSFORM              │
│ COEFFICIENTS OF THE TRANSFORM UNIT BASED ON             │──── 1404
│ COEFFICIENT VALUES OF THE TRANSFORM UNIT                │
└─────────────────────────────────────────────────────────┘
                            │
                            ▼
┌─────────────────────────────────────────────────────────┐
│ WHEN THE DETERMINED PATTERN MATCHES A PRE-DEFINED       │
│ PATTERN, DETERMINE WHETHER A TRANSFORM TYPE USED IN     │──── 1406
│ CODING MATCHES A DEFAULT TRANSFORM TYPE ASSOCIATED      │
│ WITH THE PRE-DEFINED PATTERN                            │
└─────────────────────────────────────────────────────────┘
                            │
                            ▼
┌─────────────────────────────────────────────────────────┐
│ WHEN THE DETERMINED PATTERN MATCHES THE PRE-            │
│ DETERMINED PATTERN, THE TRANSMITTED CODED DATA OF       │──── 1408
│ THE TRANSFORM UNIT OMITS AN IDENTIFICATION OF A         │
│ TRANSFORM TYPE APPLIED DURING THE TRANSFORMING          │
└─────────────────────────────────────────────────────────┘
```

*FIG. 14*

COEFFICIENT-BASED TRANSFORM AND MODE SIGNALING

CLAIM FOR PRIORITY

This application benefits from priority conferred by U.S. Patent application Ser. No. 63/392,943, entitled "Coefficient-Based Transform and Mode Signaling," filed Jul. 28, 2022, the disclosure of which is incorporated herein in its entirety.

BACKGROUND

This disclosure relates to encoding and decoding of image and video data.

A conventional image/video codec consists of an encoder and decoder and can compress image and video data for transmission and storage. Some examples of standardized coding technologies include H.264 (AVC), H.265 (HEVC), H.266 (VVC), and AV1. A new video encoding and decoding software, called AOM Video Model (AVM), is currently under development by AOMedia with the intent being that the resulting specification will become the successor to the AV1 specification. Conventional codecs are block-based and they first partition an image or video frame into smaller image regions, often called "coding blocks." This partitioning is a multi-stage process where a frame is first split into smaller coding-tree units (CTUs) or super-blocks (SBs). A CTU or SB can further be divided into smaller coding blocks (CBs). In FIG. 1, an exemplary illustration is provided for the H.266 coding standard at the encoder side. Most video coding specifications, including HEVC, AV1, follow a similar logic as in FIG. 1. Following this illustration, each input frame is first split into CBs.

After the partitioning stage, a video encoder can predict pixel samples of a current block from neighboring blocks by using intra prediction. Alternatively, a codec may also use pixel information from different temporal frames and blocks from other frames by using inter prediction techniques. Some of these prediction techniques may include the use of motion compensated prediction, temporal interpolated prediction, weighted prediction, or even utilize a combination of both inter and intra prediction. The prediction stage typically reduces the spatial and/or temporally redundant information in coding blocks from neighboring samples or frames. The resulting block after subtracting the predicted values (e.g., with intra or inter prediction) from the block of interest is usually called the "residual block." The encoder may further apply a transformation on the residual block using variants of the discrete cosine transform (DCT), discrete sine transform (DST), or other available transforms. The block on which a transform is applied is usually referred to as a "transform unit" (TU).

The transform stage provides energy compaction in the residual block by mapping the residual values from the pixel domain to an alternative Euclidean space. This stage effectively reduces the number of bits required to transmit the energy-compacted coefficients. It is also possible for a video codec to skip the transform stage. Usually, skipping is done if a codec determines that performing a transform on the residual block is not beneficial, for example in cases when the residual signal after prediction is already compact enough and a DCT-like transform does not provide additional compression benefits.

After the transform stage, the resultant coefficients are passed through a quantizer, which reduces the number of bits required to represent the transform coefficients. Additionally, optimization techniques such as trellis-based quantization or dropout optimization can be employed to tune the quantized coefficients based on a rate-distortion criteria. The quantization stage can cause significant loss of information, especially at low bitrate targets. In such cases, quantization may lead to a visible distortion or loss of information in images/video. The tradeoff between the rate (amount of bits sent over a time period) and distortion is often controlled with a quantization parameter (QP). In the entropy coding stage, the quantized transform coefficients, which usually make up the bulk of the final output bitstream, are signaled to the decoder using lossless entropy coding methods such as the multi-symbol arithmetic coding (MS-AC) in AV1/AVM and context-adaptive binary arithmetic coding (CABAC) in VVC, and HEVC.

In addition to the quantized coefficients, certain encoder decisions are signaled to the decoder as side information. Some of this information may include partitioning types, intra and inter prediction modes (e.g. weighted intra prediction, multi-reference line modes, etc.), transform type applied to transform blocks and or other flags/indices pertaining to tools such as a secondary transform. This side information usually accounts for a smaller portion of the final bitstream as compared to quantized transform coefficients. The decoder uses the side information to perform an inverse transformation on the de-quantized coefficients and reconstruct the pixel samples. Additional tools including restoration, de-blocking, and loop-filters may also be applied on the reconstructed pixel samples to enhance the quality of the reconstructed images.

TABLE 1

Transform Types in AV1 and AVM

| | Transform Type | Vertical Mode | Horizontal Mode |
| --- | --- | --- | --- |
| DCT_DCT | 2D | DCT | DCT |
| ADST_DCT | 2D | ADST | DCT |
| DCT_ADST | 2D | DCT | ADST |
| ADST_ADST | 2D | ADST | ADST |
| FLIPADST_DCT | 2D | Flipped ADST | DCT |
| DCT_FLIPADST | 2D | DCT | Flipped ADST |
| FLIPADST_FLIPADST | 2D | Flipped ADST | Flipped ADST |
| ADST_FLIPADST | 2D | ADST | Flipped ADST |
| FLIPADST_ADST | 2D | Flipped ADST | ADST |
| IDTX | 2D | Identity | Identity |
| V_DCT | 1D | DCT | Identity |
| H_DCT | 1D | Identity | DCT |
| V_ADST | 1D | ADST | Identity |
| H_ADST | 1D | Identity | ADST |
| V_FLIPADST | 1D | Flipped ADST | Identity |
| H_FLIPADST | 1D | Identity | Flipped ADST |

In both the AV1 and AVM reference software several transform candidates can be used by intra and inter coded blocks. These transforms, which are summarized in Table 1, consist of a combination of: 1) the discrete cosine transform (DCT), 2) the asymmetric discrete sine transform (ADST), 3) the flipped ADST, and 4) the identity transform (IDTX). Transforms can be applied either horizontally or vertically as 1D transforms or can be applied both horizontally and vertically with separable 2D transforms. IDTX skips a trigonometric transform both vertically and horizontally and is considered as a transform skip case. Once a suitable transform type is selected by the encoder, it is then signaled to the decoder using different transform sets. Some of these transform sets are shown in Table 2. For instance, a discrete trigonometric transform set (DTT4) in the AVM contains 4 possible transform types where combinations of DCT and ADST may be used. The DTT4 set can be selected for intra coded blocks when the minimum of the height or width of a block is less than 8. Other transform sets also are shown in Table 2 that include DTT9, which may be used for larger inter coded blocks. Application of these sets can reduce the signaling overhead of different block types and sizes when a transform type needs to be signaled.

TABLE 2

|  | Vertical Mode | Horizontal Mode | TX Set |
|---|---|---|---|
| DCT_DCT | DCT | DCT | DTT 4 Set |
| ADST_DCT | ADST | DCT |  |
| DCT_ADST | DCT | ADST |  |
| ADST_ADST | ADST | ADST |  |
| FLIPADST_DCT | Flipped ADST | DCT | DTT 9 Set (includes |
| DCT_FLIPADST | DCT | Flipped ASDT | DTT 4 Above) |
| FLIPADST_FLIPADST | Flipped ASDT | Flipped ASDT |  |
| ADST_FLIPADST | ASDT | Flipped ASDT |  |
| FLIPADST_ADST | Flipped ASDT | ASDT |  |
| IDTX | Identity | Identity | 1D DCT |
| V_DCT | DCT | Identity |  |
| H_DCT | Identity | DCT |  |
| V_ADST | ADST | Identity |  |
| H_ADST | Identity | ADST |  |
| V_FLIPADST | Flipped ADST | Identity |  |
| H_FLIPADST | Identity | Flipped ADST |  |

TABLE 3

| min(W, H) | Intra | Inter |
|---|---|---|
| 4 | DTT4, 1DDCT | All 16 |
| 8 | DTT4, 1DDCT | All 16 |
| 16 | DTT4 | DTT9, IDTX, 1DDCT |
| 32 | DCT Only (no signaling) | DCT, IDTX |
| 64 | DCT Only (no signaling) | DCT Only (no signaling) |

In the AVM, a secondary transform called the "intra secondary transform" (IST) also can be performed. The IST is applied on top of the primary transform coefficients to further compact these transform coefficients but, in contrast to DCT-like transforms, the IST is data-driven using trained non-separable kernels. IST kernels can be selected based on intra modes, or they can be decided by the encoder based on a variety of criteria, such as rate-distortion or rate-distortion-complexity criteria, and signaled to the decoder side. In the AVM, the IST is used only when the primary transform type is either the 2D DCT or 2D ADST. An encoder may signal additional IST related modes to the decoder to indicate the specific kernel it uses for the present bocks in addition to the transform type signaling.

Coefficient Coding in AV1/AVM

Regardless of the transform type selected by an encoder, the resulting coefficients from the transform stage or the prediction residuals are signaled to the decoder. Coefficient coding in the AVM can be summarized in three parts: 1) coding of the all_zero flag and transform types, 2) signaling of the last coefficient position or the end-of-the block (EOB) syntax, and 3) coefficient coding to transmit absolute values and signs of each coefficient sample.

All_Zero Flag and Transform Types

AV1 and the AVM first determine the position of the last significant coefficient in a TU for a given scan order. When all coefficients in a coding block are determined to be significant, then the coding block's last coefficient position may be assigned as an end-of-block (EOB) position. Herein, for simplicity, the term "EOB" refers to the last significant coefficient position of a coding block. If the EOB value is 0, then the present TU does not have any significant coefficients and nothing else needs to be coded for the current TU. Therefore, the coefficient coding process can be terminated for the current TU. In this case, only a TU skip flag (all_zero syntax in AV1) is signaled to indicate whether the EOB is 0. This is also shown in FIG. 2, which illustrates the signaling order of the syntax elements related to coefficient coding. In FIG. 2, if the EOB value is non-zero (eob>0) for a given TU, then a transform type is coded only for luma blocks. Transform type is not coded for chroma blocks but is rather inferred by a decoder from the co-located luma block or intra mode, depending on whether the TU is an intra or inter coded block. Additionally, an IST flag and the kernel type (stx_type) may be signaled based on the primary transform type.

Last Coefficient Position or End-of-the Block (EOB) Syntax

The last coefficient position or an EOB syntax is explicitly coded after all zero syntax. This EOB value determines which coefficient indices to skip during coefficient coding and decoding. To provide an example, in FIG. 3, in the top-left corner an example is provided for a 4×4 TU. If EOB=5, then only coefficients at indices 0, 1, 2, 3, and 4 are visited and need to be decoded. Other coefficient indices (>5) are not considered during the coefficient coding stage. The EOB value may be signaled using multi-symbol syntax elements after binarizing the EOB index value. If the value is too large, bypass coding (non-arithmetic) can be further used. In codecs such as VVC and HEVC, CABAC may signal the row and column indices associated with the EOB value (e.g. last_x and last_y) in a given TU after binarizing the x- and y-locations of the last significant coefficient position.

Coefficient Coding

If a coefficient index is less than the EOB value, then it is visited during the coefficient coding stage. Coefficients are coded in multiple passes using loops. These loops visit each coefficient location based on a given scan order, such as the zig-zag, row, column, or diagonal scans. Each coefficient in a TU is first converted into a "level" value by taking its absolute value. For square blocks with a 2D transform, a reverse Zig-zag scan is used in AV1 and the AVM to encode the level information. As shown in FIG. 3, this scan starts from the bottom right side of the TU in a coding loop from coefficient location 15 until the scan index hits location 0 (the numerical values in FIG. 3 represent the order in which coefficient positions in the coding block are scanned according to the indicated scan direction). In cases where the EOB value is less than 15, the level coding starts from the EOB value and loops until the scan index hits 0. The level values are signaled to the decoder in multiple passes as follows:

Base Range (BR): This covers level values of 0, 1, 2, and 3. If a level value is less than 3, consequently the level coding loop terminates here and coefficient coding does not visit the Low/High ranges as discussed next. A value of 3 indicates that the level value can be equal or greater than 3 for BR pass. The level values are context coded depending on the neighboring level values and other parameters such as the transform size, plane type, etc.

Low Range (LR): This range covers level values between [3-14]. The level values are context coded depending on the neighboring level values and other parameters such as transform size, plane type, etc.

High Range (HR): This range corresponds to level values greater than 15. The level information beyond 15 is coded with Exp-Golomb code without using contexts.

After level values are coded in a reverse scan order, the sign information is coded separately using a forward scan pass over the significant coefficients. The sign flag is bypass coded with 1 bit per coefficient without using probability models. The motivation of bypass coding here is to simplify entropy coding since DCT coefficients usually have random signs. In the AVM, there is newer context-coding logic for specific cases, e.g., when the transform type is the IDTX or across different UV color planes.

In AV1, level information is encoded with a proper selection of contexts or probability models using multi-symbol arithmetic encoding. These contexts are selected based on various information such as the transform size, color plane (luma or chroma) information, and the sum of previously coded level values in a spatial neighborhood. FIG. 3 illustrates several examples of how the contexts are derived based on neighboring level values. For base range coding with the Zig-zag scan, the level value for scan index #4 can be encoded by using the level values in the green neighborhood (7, 8, 10, 11, 12). The level values in this neighborhood are summed together to select an appropriate probability mode or a context index for arithmetic coding. The green blocks are already decoded since level information is decoded in a reverse scan order. Likewise, 1D transforms can only access the previously decoded 3 neighboring samples. Low Range coding constrains the context derivation neighborhood for 2D transforms to be within a 2×2 region.

BRIEF DESCRIPTION OF THE DRAWINGS

FIG. 2 illustrates signaling order of the syntax elements related to coefficient coding in AV1 and AVM-based video coding.

FIG. 3 illustrates different coefficient scanning processes for AV1 and AVM-based video coding.

FIG. 5 illustrates exemplary transform units to which embodiments of the present disclosure may be applied. Specifically, FIG. 5(a) illustrates an 8×8 transform unit with an end of block condition at coefficient position 0, FIG. 5(b) illustrates an 8×8 transform unit with an end of block condition at coefficient position 2, and FIG. 5(c) illustrates an 8×8 transform unit with an end of block condition at coefficient position 62.

FIG. 8 illustrates applications of pattern matching to exemplary transform units according to an embodiment of the present disclosure. Specifically, FIG. 8(a) illustrates a pattern matching that results in an inference that a 1D vertical DCT transform is to be used for coding and decoding. FIG. 8(b) illustrates a pattern matching that results in an inference that a 1D horizontal DCT transform is to be used for coding and decoding.

FIG. 14 is a flowchart showing an alternate example of a process for video coding according to an embodiment of the present disclosure.

DETAILED DESCRIPTION

In the present disclosure, a new inference and signaling method is described. This method uses information derived from the coefficient samples in a given transform unit TU or prediction unit PU in order to constrain or modify signaling of certain syntax elements at the CB, TU, or PU levels. For instance, based on the spatial locations of decoded coefficients, the spatial patterns of coefficients, or the correlation with the coefficients in neighboring blocks, various syntax elements such as the transform type and related flags/indices or secondary transform modes/flags indices, a residual coding mode, intra and inter prediction modes, and scanning order may be disabled or constrained. In another case, if the coefficient samples match a desired spatial pattern or have other desired properties, then a default transform type, a default secondary transform type, a default intra and inter prediction mode or other block level modes may be inferred at the decoder side. Similar ideas may be extended to infer intra-block copy (IBC) flags/modes/indices from coefficient samples, or to infer flags and modes related to predictive coding techniques such as block-wise differential pulse code modulation (BDPCM), i.e., horizontal and vertical BDPCM modes, palette mode syntax and other block level flags/indices. The scheme proposed here can be used in new image and video coding specifications and their implementations such as extensions of HEVC (H.265) and VVC (H.266) from MPEG/ITU-T, or of AV1 by the Alliance for Open Media (AOM), such as its successor development model AVM (AOM Video Model).

Figure 1:
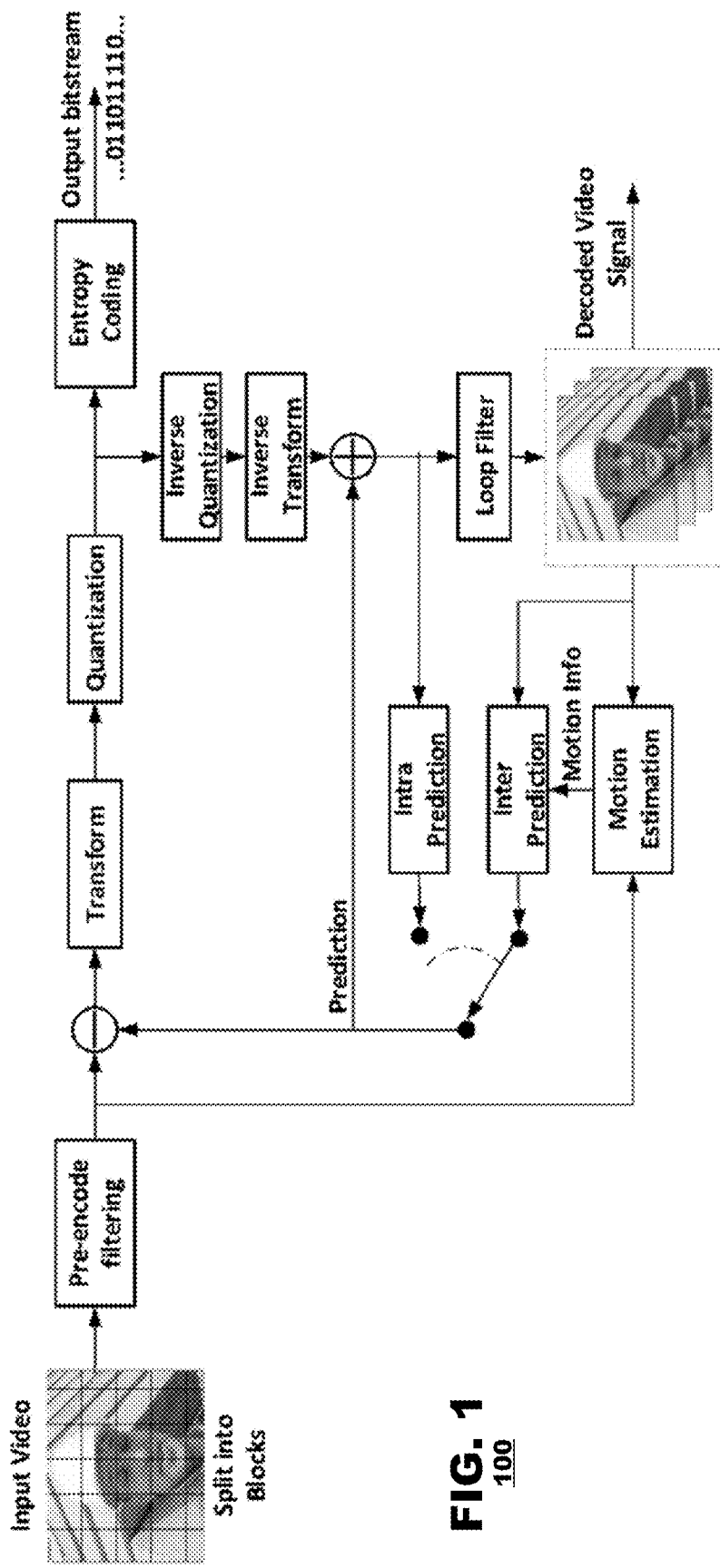
FIG. 1 illustrates coding operations that may be employed for H.266-based video encoding.
Figure 4:
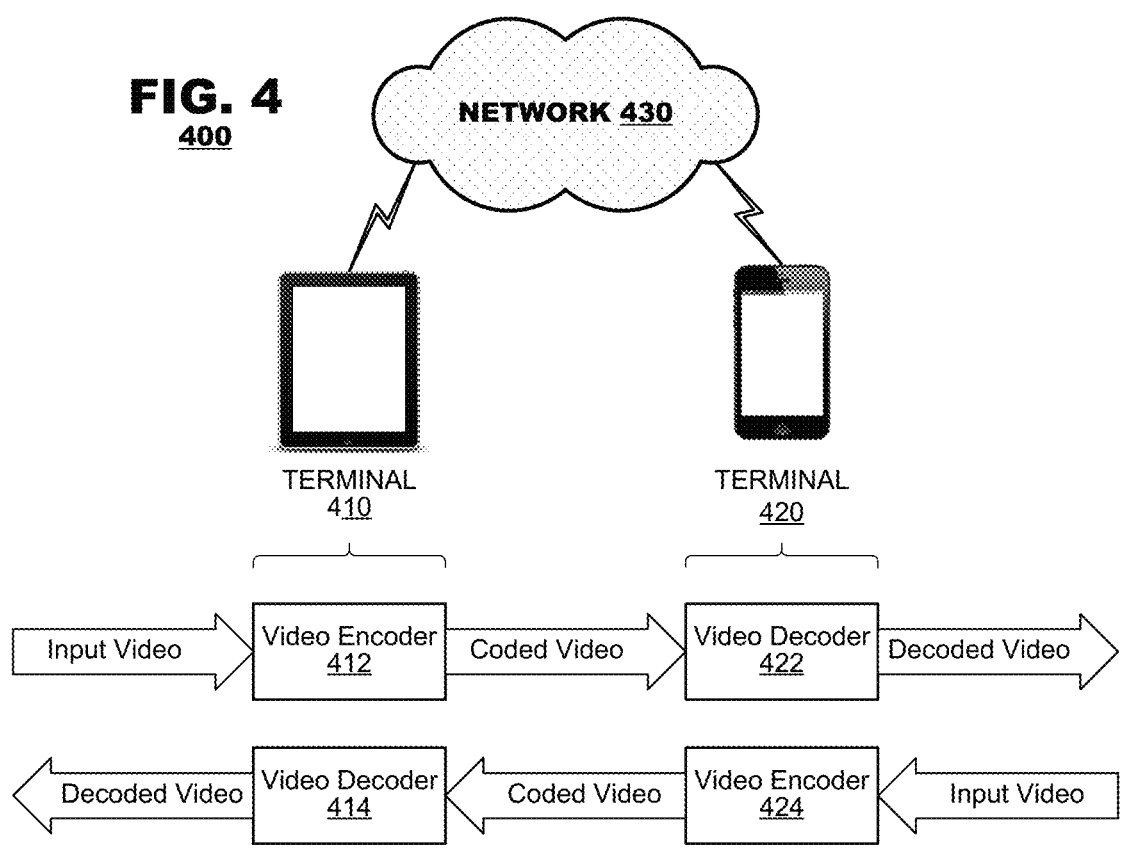
FIG. 4 illustrates a video coding/decoding system suitable for application of embodiments of the present disclosure.

The principles of the present disclosure find application in a video coding and decoding system 400 such as shown in FIG. 4. As illustrated in FIG. 4, a pair of terminal devices 410, 420 may be provided in mutual communication over a network 430. The terminals 410, 420 may exchange coded video either unidirectionally or bidirectionally over the network 430. For unidirectional video exchange, a first terminal 410 may possess a video encoder 410 that codes input video into a coded representation that is bandwidth compressed in comparison to the input video. The first terminal 410 may transfer the coded video to the second terminal 420 over the network 430. The second terminal 420 may possess a video decoder 422 that inverts coding operations applied by the video encoder 412 and generates a decoded video stream therefrom. As discussed, coding and decoding operations may be lossy processes and, therefore, the decoded video may represent the input video from which it is derived but with some processing errors.

For bidirectional video exchange, the coding/decoding process may be repeated for video exchange in the opposite direction, from terminal 420 to terminal 410. In such an implementation, the terminal 420 may possess its own video encoder 424. The video encoder may code a second input video into a coded representation that is bandwidth compresses in comparison to the input video. The second terminal 420 may transfer the second coded video to the first terminal 410 over the network 430. The first terminal 410 may possess a video decoder 414 that inverts coding operations applied by the second video encoder 424 and generates a second decoded video stream therefrom. Again, the coding and decoding operations of the second video encoder 424 and the second video decoder 414 may by lossy processes that cause loss of information if the second decoded video were compared to the second input video.

The processing operations performed by the first video encoder 414 and the first video decoder 422 may be performed independently of the processing operations performed by the second video encoder 424 and the second video decoder 414.

This disclosure describes a new inference and signaling method that uses the information derived from coefficient samples in each TU or PU in order to constrain or modify signaling of certain syntax elements at the CB, TU, or PU levels. For instance, based on the spatial locations of coded coefficients, the spatial patterns of coefficients, or the correlation with the coefficients in neighboring blocks, syntax elements such as the transform type and any related flags/indices or the secondary transform modes/flags indices, the residual coding mode, intra and inter prediction mode, and the scanning order may be disabled or constrained.

In one embodiment, a last position index or an end-of-the block identifier (again, EOB, for convenience) may be signaled to the decoder side before transform syntax signaling. This EOB identifier may indicate the location of the last significant coded coefficient inside a TU. Based on the signaled EOB value, transform signaling can be skipped and the decoder may infer the transform type to be a default transform type such as the 2D DCT transform. In general, the default transform type may be an arbitrary transform with some examples listed in Table 1.

FIG. 5 illustrates transform units with several exemplary EOB positions. In FIG. 4, the numbers at each coefficient position represent the coefficient's scanning order for the TU. FIG. 5 shows application of an exemplary zig-zag scan, but encoders may employ scan orders such as those shown in FIGS. 3, 7, and 8 herein.

Figure 6:
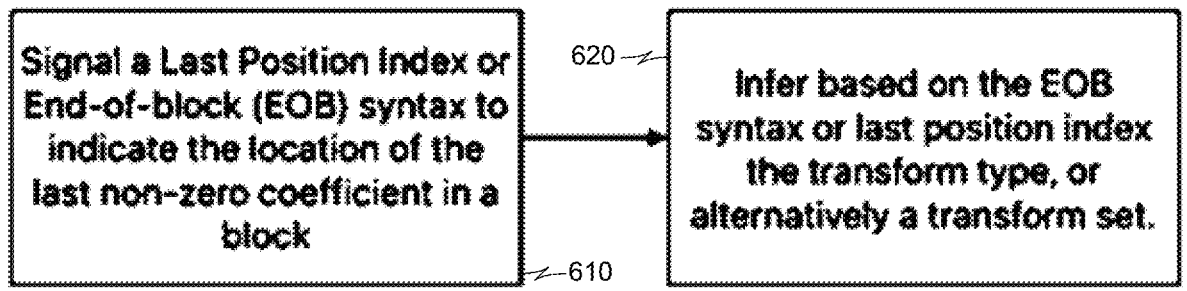
FIG. 6 illustrates a method for inferring transform type based on an end of block syntax according to an embodiment of the present disclosure.

In FIG. 5(a), an 8×8 TU is illustrated where the last significant coefficient location is shown at the coefficient index "0". In the FIG. 5(a) example, since there is at least 1 non-zero coefficient at the coefficient location "0" (marked with an x), this case corresponds to EOB=1. Note that EOB=0 may be reserved to indicate that the TU has no significant coefficients (e.g., all_zero syntax explained in Section 3.2.1). Based on the decoded EOB=1, a decoder 422 (FIG. 4) may infer the transform type to be a default transform type for this DC-only block. This logic is illustrated in FIG. 6, where an encoder 412 may signal a last position index that indicates the location of the last non-zero coefficient in a block (step 610) and a decoder 422 may infer, based on the EOB syntax element, the transform type or transform set that applies to the block (step 620). Alternatively, if a codec uses multiple transform sets to constrain signaling overhead, an EOB=1 further may mean that a transform set is selected by the decoder 422 to only include the 2D DCT transform in the derived set for a DC-only block.

In one embodiment, a last position index or an end-of-the block (EOB) syntax element may be signaled to the decoder side before transform type signaling. Based on the signaled EOB value, an encoder 412 (FIG. 4) may skip explicit transform type signaling and the decoder 422 may infer the transform type to be a default transform type. The default transform type can be derived or inferred based on various CB level or TU level syntax elements such as the intra/inter prediction modes, multiple reference line (MRL) flags/indices, and the angle delta (AD) offset in intra prediction. In one example, if the intra prediction mode is DC prediction and EOB=1, then the decoder 422 may infer the transform type to be the DCT_DCT. In another case, if the intra prediction mode is set to the one corresponding to an angle of 157 degrees and EOB=1, then the decoder 422 may infer the transform type as being equal to ADST_ADST. In one embodiment, in VVC (H.266) and other MPEG specifications, the EOB syntax may be coded with the x- and y-coordinates of the last coefficient position instead of directly binarizing and coding the EOB value according to a scan order. In this case, if the x- and y-coordinates are both signaled as zero to the decoder 422, then the current TU may be a DC-only block. In this case, the decoder 422 may further infer the transform type to be a default transform type such as the type-2 DCT applied in 2D for this DC-only TU.

In one embodiment, if EOB<T1, where T1 is a predetermined threshold, then a decoder 422 (FIG. 4) may infer that the transform type is a default transform. For instance, if T1=4 and the actual value of EOB=3, this means that the present TU can only have a maximum of 3 significant coefficients at indices 0, 1, and 2. This is shown in FIG. 5(b), where EOB=3 and the location of the last significant coefficient is marked at coefficient index 2 for a zig-zag scan. Since the EOB value is less than T1, an encoder 412 (FIG. 4) may then skip signaling of a specific transform and use a default transform. The decoder 422 in this case may first decode the EOB value and check if it lies in the interval 0<=EOB<T1 to infer the default transform as well. The default transform can be any transform type such as the 2D DCT.

In one embodiment, if EOB>T2, where T2 is an arbitrary threshold, then a decoder 422, 414 (FIG. 4) may infer that the transform type is a default transform. For example, for an 8×8 TU, there are at most 64 coefficient samples. This is shown in FIG. 5(c). If the threshold T2=60 for a TU and the actual decoded EOB value is 63, then this means that a TU has a significant coefficient at a very large coefficient index closer satisfying T2<EOB<=64. In this case, the decoder 422 (FIG. 4) may infer that the transform type is a predetermined transform such as the IDTX transform and transform signaling may be skipped for the present TU. The default transform can be any transform type.

In one embodiment, if the EOB value is decoded to satisfy either EOB<T1 or EOB>T2 then the decoder 422 (FIG. 4) may further infer that only a subset of transforms need to be used. In this case the encoder 412 no longer disables transform type signaling. However, the encoder 412 may signal a transform type from a subset of available transform candidates. For instance, in Table 2, some transform sets were defined for AV1 and the AVM, including the DTT4 or DTT9. These transform sets are currently used in AV1. DTT4 uses a 4 symbol syntax element and DTT9 uses a 9 symbol syntax element to encode a transform type in the bitstream. If the EOB threshold conditions above or rules stated above are satisfied, then an encoder 412 (FIG. 4) can signal a binary symbol to indicate between two transform types such as: 2D DCT or 2D ADST. In one example, a new DTT2={DCT_DCT, ADST_ADST} set can be defined based on which the encoder/decoder can chose from 2 alternative transform types. A binary symbol corresponding to the DTT2 can be signaled to the decoder 422 (FIG. 4) to indicate which transform type from the DTT2 set to apply. For instance, a value of 0 may indicate the DCT_DCT (2D DCT) while a value of 1 may indicate the ADST_ADST (2D ADST).

In one embodiment, if EOB<T1, where T1=2, means that a TU has only one coded coefficient at the DC-term location (i.e. EOB=1). This case is shown in FIG. 5(a). In this case, the decoder 422 (FIG. 4) can use the DTT2 set to decode a specific transform type from a context coded binary symbol.

In general, an arbitrary DTT{N} set can be defined where this set contains N possible transform candidates. An encoder 412 (FIG. 4) may use this set to signal a transform type if the EOB conditions described in this disclosure are satisfied. Note that the DTT{N} set may include a primary transform type indicated in Table 1 as well as other transform types including the secondary transform modes/flags or indices.

Figure 7:
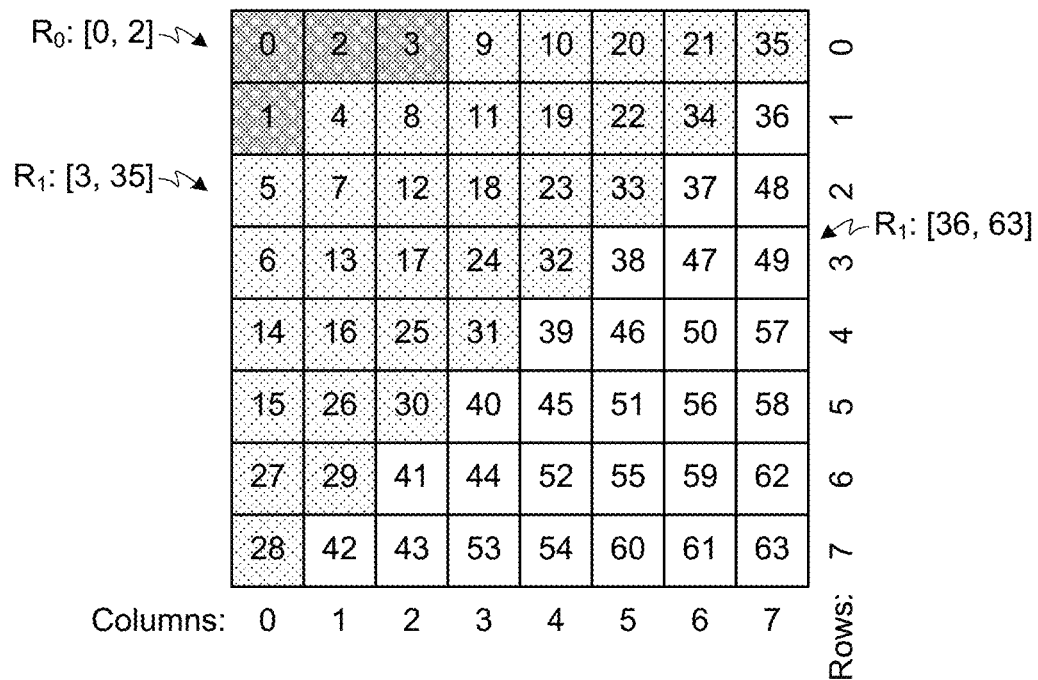
FIG. 7 illustrates application of range partitioning to an exemplary transform unit according to an embodiment of the present disclosure.

In one embodiment, given an M×N TU, there are M×N coefficient samples residing inside the TU. Several ranges 0<=R1<R2< . . . <Ri< . . . <(M×N) can be defined to split the coefficient indices from 0 to M×N. The range Ri may be determined based on the scanning order or based on the spatial locations of coefficients inside a TU. If an EOB value resides in a range Ri, then an encoder 412 (FIG. 4) may skip transform type signaling for that TU and a default transform type (e.g. DCT_DCT, ADST_ADST, IDTX, . . . ) may be inferred by the decoder 422 (FIG. 4). Alternatively, different DTT{N}i sets where i=0, 1, . . . , N may be defined for different ranges Ri as shown in FIG. 7. Depending on which region to which the EOB value corresponds, a transform type may be decoded using the available transform types in the DTT{N}i set.

In one embodiment, a range partitioning 0<=R0<R1<R2< (M×N=64) is shown in FIG. 7 below for an 8×8 TU. The ranges are defined according to the index values of a Zig-zag scan as shown in FIG. 7. In this example, scan indices 0, 1, and 2 are shown as corresponding to range R0, scan indices 3 to 35 are shown as corresponding to range R1, and scan indices 36 to 63 are shown as corresponding to range R2. If the EOB value corresponds to a specific region Ri, then a decoder 422 (FIG. 4) may identify an applicable transform type using the available transform types in the DTT{N}i set.

In one embodiment, if the EOB conditions explained above are satisfied, the secondary transform syntax signaling, such as the intra secondary transform (IST) in the AVM or low frequency non separable transform (LFNST) in VVC, may be disabled. The decoder 422 (FIG. 4) may first decode the EOB value and based on the satisfied EOB conditions, the decoder 422 may further infer that the secondary transform for the current TU(s) is disabled and set the flags and indexes related to a secondary transform (i.e. Ifnst_idx for LFNST, stx_flag for IST) equal to 0.

In one embodiment, based on the EOB conditions explained above, a secondary transform may always be applied to a TU but with its syntax signaling disabled. For instance, the decoder 422 may determine that a secondary transform is applied after the primary transform. However, only a specific kernel of the secondary transform is used without signaling a mode index associated with it. In one case, a transform type is not signaled and, instead, may be inferred as the 2D DCT and additionally a secondary transform such as the LFNST and IST is applied with a default kernel and no signaling is performed. To provide some examples, in VVC, Ifnst_idx=1 may be inferred at the decoder 422 associated with mode 1. For IST, an arbitrary default kernel may be used in the AVM.

In one embodiment, a DTT2 transform set may be formed as follows: DTT2={DCT_DCT, DCT_DCT+IST or LFNST Enabled (Kernel 1)}. An EOB value first may be decoded and compared to a threshold or a rule, as explained above. If the EOB value satisfies the conditions, then a syntax is signaled to indicate whether the current block uses 1) a 2D DCT transform if flag value is 0, or 2) a 2D DCT primary transform with additional secondary transform (i.e. IST or LFNST) applied if flag value is 1. If flag value decoded with DTT2 equals 1, then the kernel used for the secondary transform may be inferred to be the first available kernel (default kernel) which would avoid signaling overhead associated with secondary transform kernel selection. Alternatively, a DTT3={DCT_DCT, DCT_DCT+IST or LFNST Enabled (Kernel 1), DCT_DCT+IST or LFNST Enabled (Kernel 2)} may be formed to include more candidates for transform selection.

In one embodiment, the multiple transform set selection (MTS) in VVC may be modified to skip transform signaling and signaling of the transform skip flag if based on the EOB conditions explained above. Alternatively, the MTS may be modified to only signal a subset of available transforms.

Figure 8:
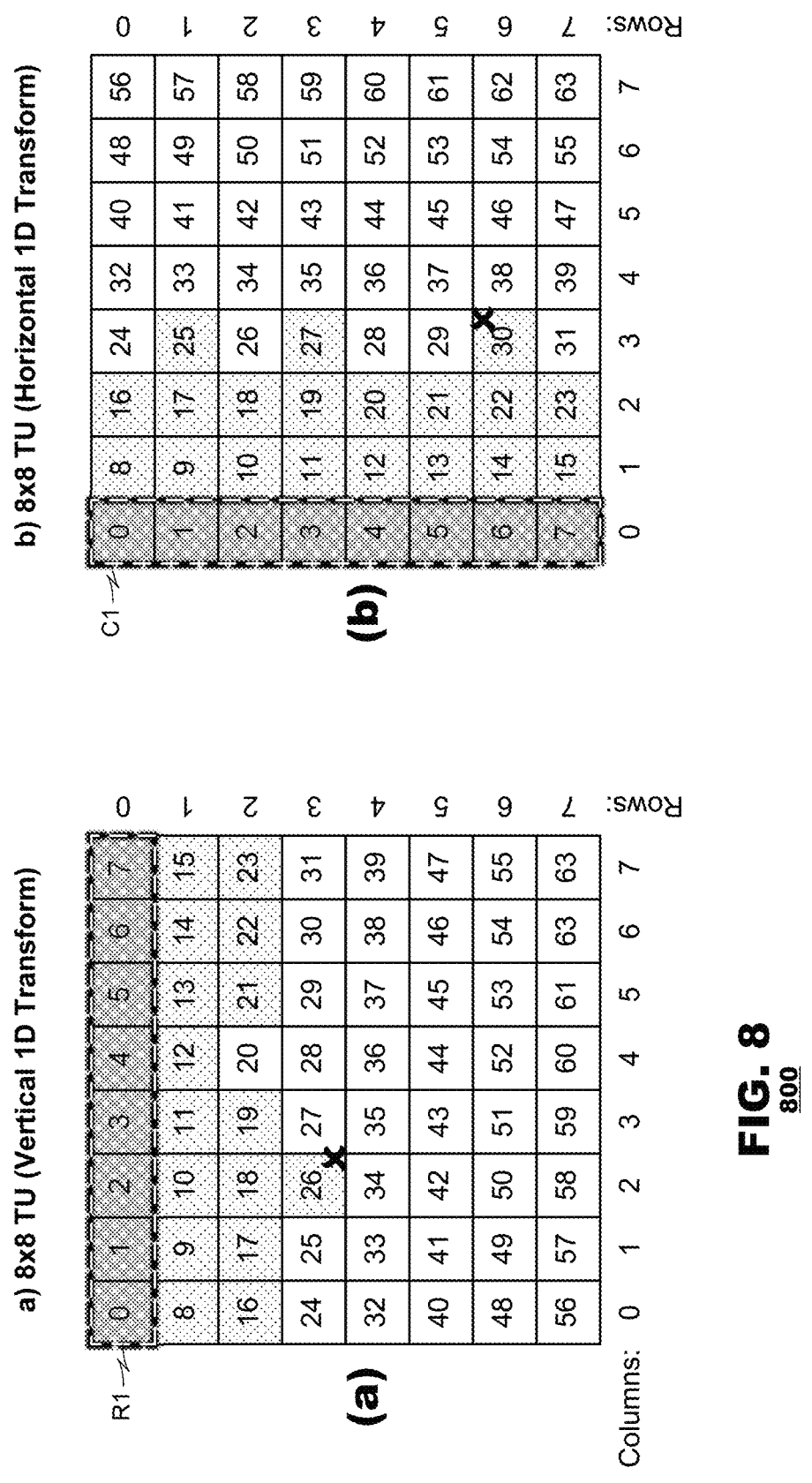

In one embodiment, the decoder 422 (FIG. 4) can firstly decode the coefficient samples. The decoder 422 can then use these coefficient samples or patterns of these samples to infer a transform type or other flag indices. For instance, if the coefficient pattern (or the coefficient matrix C) is matched to a pattern Pi, then the decoder 422 may infer a default transform type and set for the current TU, which avoids transform related signaling being provided by the encoder 412 (FIG. 4). One example is illustrated in FIG. 8. In FIG. 8(a), coefficient level values (absolute coefficient values) are shown for an 8×8 TU for a vertical transform such as the column-wise DCT. Since a DCT kernel is applied for each column separately, it is likely for each column to have a DC-term at row=0 for all columns due to the energy compaction property of the DCT transform. This is shown as region R1. The decoder 422 can look at this pattern in FIG. 8(a) and infer that a 1D vertical DCT transform is used and skip decoding the transform type flag. A similar example follows in FIG. 8(b) where a horizontal transform is applied independently to all rows of an 8×8 TU. The resulting coefficient patterns are different in this case and the decoder can check the decoded coefficients to infer that a 1D horizontal transform is applied. In such cases where the decoder 422 may infer coding parameters, the encoder 412 need not provide such coding parameters in the coded video data bitstream.

Figure 9:
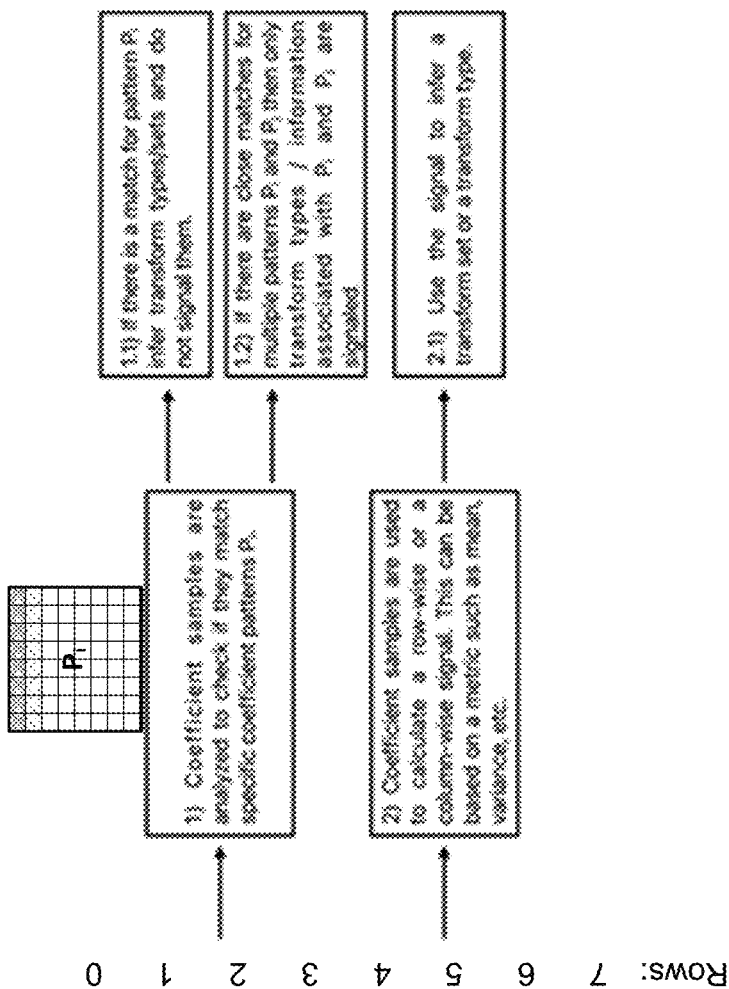
FIG. 9 illustrates a coding process according to an embodiment of the present disclosure.

In one embodiment, a coding process is shown in FIG. 9. A matrix C 910 may be formed using the coefficient samples in a TU. This matrix C, for instance, may hold the coefficient absolute values after decoding. In approach (1), the matrix C can be analyzed to check if it matches a specific pattern Pi (step 920). This pattern is also illustrated in FIG. 9. If C and Pi are matching under a correlation, similarity, or distance metric defined for matrices (condition 1.1) then the decoder may infer a combination of, transform types, transform sets, secondary transform sets, and modes (step 930). If there are multiple patterns e.g. Pi and Pj matching C (condition 1.2), then a transform set such as DTT2 may be formed to only signal transform types associated with Pi and Pj with the rest of the transform types excluded from arithmetic coding (step 940).

In one embodiment, a pattern Pi may be hand-tuned or empirically determined. In one example Pi may consist of weights (e.g. 0, 0.5, 1) at each coefficient location. The Pi illustrated in FIG. 9 is an example for a hand-tuned mask, which has weights 1.0 in the first row, 0.5 in the second row, and 0 weights elsewhere. In this case, a correlation, similarity score or a distance metric between C and Pi may be computed. This metric can be arbitrary and would reveal a quantitative score of similarity between the two matrices. One such example is the Frobenius norm of the difference $\|C-Pi\|F$, which may be computed across different coefficient pattern matrices Pi for i=0, 1, . . . , N. In this case the smallest norm could correspond to the closest pattern matching C. Alternatively, C can be masked with Pi via element-wise multiplication of matrices C and Pi, and a function F can map the masked matrix into a numerical score. The decoder 422 (FIG. 4) can determine which Pi more closely represents C and infer relevant mode decisions such as transform type, intra/inter modes, scanning orders, or other block level modes.

In an alternative embodiment, a similarity between rows (or columns) of C and Pi may be considered instead of computing a metric on the full matrices. For instance a correlation coefficient, cosine similarity or other vector-wise metrics computed between the rows of C and Pi would reveal a per-row score of similarity (step 950). This can be used to find the closest pattern to C to infer relevant mode decisions such as transform type, intra/inter modes, scanning orders, or other block level modes (step 960).

In one embodiment, patterns of different Pi's can be determined based on data. For instance, several mode decisions such as a transform type, intra or inter prediction mode, or other block level decisions can be fixed and coefficient level information can be collected based on these decisions to form a dataset. A pattern Pi associated with these mode decisions can be determined from the collected data using an unsupervised algorithm such as singular value decomposition (SVD) or principal component analysis (PCA) to reveal a dominant pattern that explains the most variance. The idea here is to minimize the KL-divergence between the identified Pi and the coefficient level data associated with the mode decisions. Other data driven approaches, such as neural networks or supervised algorithms, may also be used. In this case, a correlation, similarity, or distance metric between C and Pi may be computed at the decoder 422 (FIG. 4) to infer block level modes such as transform types, DPCM modes, residual coding methods, scan orders.

In one embodiment, a high level flag or an index at the sequence, frame, picture, or tile levels and/or, alternatively, at a lower level syntax structure such as the coding tree unit (CTU) level or the super block (SB) level may be added to indicate enabling or disabling of the transform type inference rules discussed above. This could be based on the EOB values and/or based on the coefficient patterns. In an example, if the high-level flag value is 1, this may mean inferring a default transform type or a subset of transforms based on the rules explained above. Alternatively if the high-level flag value is 0 then the inference rule is disabled for underlying blocks.

In one embodiment, a high level mode may be defined to indicate to decoder 422 (FIG. 4) to infer the transform type, or a transform subset based on a high-level index signaled to the decoder 422. For instance, a mode signaled with an index could indicate:

0: no presence of transform type related inference rules,
1: a transform type or transform set inference rule is always present in the present coding blocks under the high-level unit, or
2: switchable inference rules that apply to specific coding blocks with additional lower level signaling or other inference rules and without signaling.

In one embodiment, the inference rules described above can be signaled at the lower levels including at the prediction unit (PU), coding unit (CU), or TU levels. For instance, an encoder 412 (FIG. 4) may signal a low level flag to indicate to the decoder 422 to infer the default transform types or a smaller subset of available transform candidates. In addition to this type of low-level signaling, an additional high-level flag as described in the previous embodiment may be used to further turn on and off the low-level signaling of the transform type related inference rules.

In an alternative embodiment, a high-level or low level flag may be signaled to the decoder 422 (FIG. 4) to switch between alternative inference schemes. For instance, a flag/index value of 1 signaled to the decoder 422 may indicate that an inference scheme as illustrated in FIG. 9 may be used, in which case the decoder 422 may infer a default transform type or a subset of transform sets based on the distribution or pattern of coefficients inside a PU/TU. Another index value of 2 may indicate that only the EOB value is used to infer a default transform type or a subset of transform set as described above. In general, different indices may be used to switch between inference schemes.

In a preferred embodiment, a high-level or a block level flag/index or syntax (tx_inference_index) may be signaled to the decoder 422 (FIG. 4). An index value tx_inference_index=1 may indicate that the decoder 422 always infers a default transform type such as 2D DCT for all blocks, or a subset of blocks, alternatively an index value tx_inference_index=2 may indicate that the decoder 422 will derive a transform type based on other side information including intra prediction modes, or available transform sets. For instance, if multiple transform sets are used by the encoder 412 (FIG. 4) to signal a transform type to decoder, then tx_inference_index=2 will indicate that the decoder 422 will always use the $n^{th}$ transform type in the available transform set.

In another embodiment, the transform type signaling based on DC coefficient, or coefficient pattern may restrict signaling of an angular transform such as a Haar transform. For instance, an angular transform $T(\theta)=[\cos(\theta) \sin(\theta); -\sin(\theta) \cos(\theta)]$ may further compress samples in two chroma channels U and V jointly into two new orthogonal channels (C1, C2). The angle or an index (or indices) associated with this transform may be signaled to the decoder side. If the samples prior to angular transform $T(\theta)$ contain only a DC term or contain a specific coefficient/residual pattern as mentioned herein, then such signaling may be restricted. In this case the decoder 422 (FIG. 4) may infer the transform to be turned off or disabled.

In general, an arbitrary number of color channels such as chroma U and chroma V may contain either residual samples or transform coefficients. These residual or coefficient samples may be projected or transformed to an alternative spaces C1 and C2, CN via an arbitrary transform T or into a single channel C. This projection may be angular, $(U, V) \rightarrow T(\theta) \rightarrow (C1, \ldots, CN)$ and signaling of this angle index and other flags and indices associated with the transform may be constrained based on the U, V samples.

In another embodiment, in video codecs such as VVC (H.266), a block level flag (tu_joint_cbcr_residual_flag) may be signaled from an encoder 412 (FIG. 4) to a decoder 422 to indicate that U, V or (Cb or Cr) channels are coded jointly using a transform such as T. This block level flag may be restricted or disabled based on the coefficient patterns or if the Cb and Cr channels only contain a DC term. In general, rule(s) may be defined that restrict signal such flag if only Cb channel contains a DC term or a specific pattern. Alternatively, rule(s) may check both Cb and Cr patterns to determine if signaling should be restricted.

Figure 10:
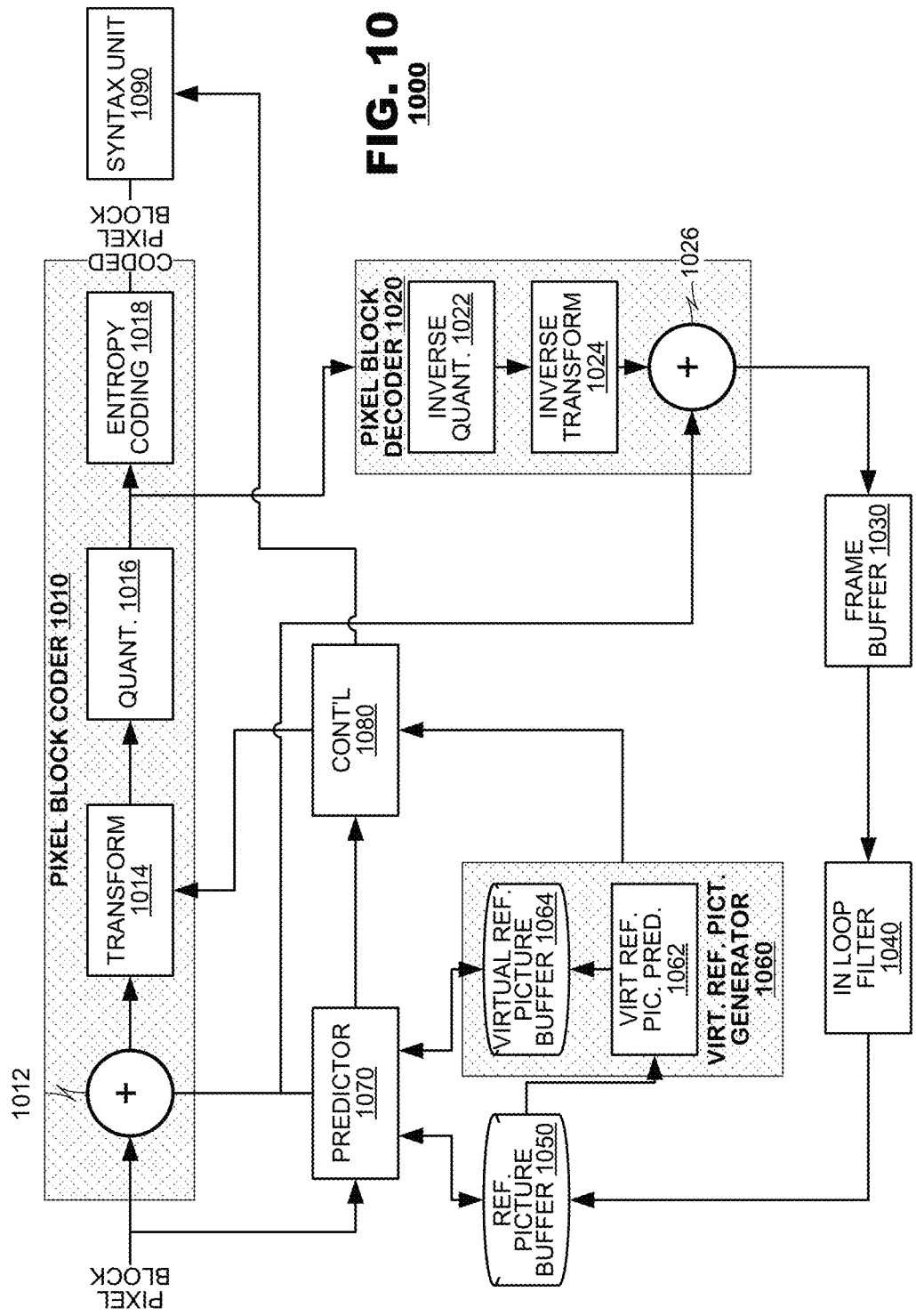
FIG. 10 is a functional block diagram of a coding system according to an embodiment of the present disclosure.

FIG. 10 is a functional block diagram of a coding system 1000 according to an aspect of the present disclosure. The system 1000 may find application as a video encoder 412, 424 (FIG. 4) for exchange of coded video. The system 1000 may include a coding block coder 1010, a coding block decoder 1020, a frame buffer 1030, an in loop filter system 1040, reference picture buffer 1050, a virtual reference picture generator 1060, a predictor 1070, a controller 1080, and a syntax unit 1090. The coding system 1000 may code input coding blocks differentially according to predictive techniques. Thus, a frame of video to be coded may be parsed into coding blocks, which the coding block encoder 1010 processes on a coding block-by-coding block basis. The coding block coder 1010 may present coded coding block data to the syntax unit 1090, which formats the coded coding block data into a transmission syntax that conforms to a governing coding protocol.

The coding block decoder 1020 may decode the coded coding block data, generating decoded coding block data therefrom. The frame buffer 1030 may generate reconstructed frame data from the decoded coding block data. The in-loop filter 1040 may perform one or more filtering operations on the reconstructed frame. For example, the in-loop filter 1040 may perform deblocking filtering, sample adaptive offset (SAO) filtering, adaptive loop filtering (ALF), maximum likelihood (ML) based filtering schemes, deringing, debanding, sharpening, resolution scaling, and the like. Filtered frames may be stored either in a reference picture buffer 1050 where it may be used as a source of prediction of later-received coding blocks.

The coding block coder 1010 may include a subtractor 1012, a transform unit 1010, a quantizer 1016, and an entropy coder 1010. The coding block coder 1010 may accept coding blocks of input data at the subtractor 1012. The subtractor 1012 may receive predicted coding blocks from the predictor 1070 and generate an array of pixel residuals therefrom representing a difference between the input coding block and the predicted coding block. The transform unit 1010 may apply a transform to the sample data output from the subtractor 1012, to convert data from the pixel domain to a domain of transform coefficients. In some scenarios (for example, when operating in high dynamic range) prior to transform unit 1010 and/or subtractor 1012, the input may be reshaped, or an adaptation scheme be applied to adjust to the content transfer characteristics. Such an adaption can be either a simple scaling, based on a re-mapping function, or a more sophisticated pixel manipulation technique. The quantizer 1016 may perform quantization of transform coefficients output by the transform unit 1010 according to a quantization parameter qp. The quantizer 1016 may apply either uniform or non-uniform quantization parameters; non-uniform quantization parameters may vary across predetermined locations of the block of coefficients output from the transform unit 1010. The entropy coder 1010 may reduce bandwidth of the output of the coefficient quantizer by coding the output, for example, by variable length code words or using a context adaptive binary arithmetic coder.

The transform unit 1010 may operate in a variety of transform modes as determined by the controller 1080. The controller 1080 may select one of the transforms described hereinabove according to the controller's determination of coding efficiencies that will be obtained from the selected transform. Once the transform to be used for coding is selected, the controller 1080 may determine whether it is necessary to signal its selection of the transform and, if so, how to signal such selection, using the techniques described hereinabove.

The quantizer 1016 may operate according to a quantization parameter qp that is determined by the controller 1080. Techniques for developing the quantization parameter are discussed hereinbelow. The controller 1080 may provide data to the syntax unit 1090 representing its quantization parameter selections.

The entropy coder 1010, as its name implies, may perform entropy coding of data output from the quantizer 1016. For example, the entropy coder 1010 may perform run length coding, Huffman coding, Golomb coding, Context Adaptive Binary Arithmetic Coding, and the like. Following entropy coding, an encoder may determine the EOB for use in determining whether and how to signal transform types as discussed hereinabove.

The coding block decoder 1020 may invert coding operations of the coding block coder 1010. For example, the coding block decoder 1020 may include a dequantizer 1022, an inverse transform unit 1024, and an adder 1026. In some scenarios (for example, when operating in high dynamic range) post to inverse transform unit 1024 and/or adder 1026, the input may be inverse reshaped or re-mapped typically according to a function that was applied at the encoder and content characteristics. The coding block decoder 1020 may take its input data from an output of the quantizer 1016. Although permissible, the coding block decoder 1020 need not perform entropy decoding of entropy-coded data since entropy coding is a lossless event. The dequantizer 1022 may invert operations of the quantizer 1016 of the coding block coder 1010. The dequantizer 1022 may perform uniform or non-uniform de-quantization as specified by the quantization parameter data qp. Similarly, the inverse transform unit 1024 may invert operations of the transform unit 1010. The dequantizer 1022 and the inverse transform unit 1024 may use the same quantization parameters qp and transform modes as their counterparts in the coding block coder 1010. Quantization operations likely will truncate data in various respects and, therefore, data recovered by the dequantizer 1022 likely will possess coding errors when compared to the data presented to the quantizer 1016 in the coding block coder 1010.

The adder 1026 may invert operations performed by the subtractor 1012. It may receive the same prediction coding block from the predictor 1070 that the subtractor 1012 used in generating residual signals. The adder 1026 may add the prediction coding block to reconstructed residual values output by the inverse transform unit 1024 and may output reconstructed coding block data.

As described, the frame buffer 1030 may assemble a reconstructed frame from the output of the coding block decoders 1020. The in-loop filter 1040 may perform various filtering operations on recovered coding block data. For example, the in-loop filter 1040 may include a deblocking filter, a sample adaptive offset ("SAO") filter, and/or other types of in loop filters (not shown). The reference picture buffer 1050 may store filtered frame data output by the in-loop filter 1040 for use in later prediction of other coding blocks.

The virtual reference picture generator 1060 may generate virtual reference frames. The virtual reference picture generator 1060 may include a virtual reference picture predictor 1062 and a virtual reference picture buffer 1064. The virtual reference picture predictor 1062 may generate the virtual reference frames from reference frames stored in the reference picture buffer 1050. The virtual reference picture buffer 1064 may store the virtual reference frames so generated for use in prediction by the predictor 1070.

Different types of prediction data are made available to the predictor 1070 for different prediction modes. For example, for an input coding block, intra prediction takes a prediction reference from decoded data of the same frame in which the input coding block is located. Thus, the reference frame store 1050 may store decoded coding block data of each frame as it is coded. For the same input coding block, inter prediction may take a prediction reference from previously coded and decoded frame(s) that are designated as reference frames. Thus, the reference frame store 1050 may store these decoded reference frames.

The predictor 1070 may supply prediction blocks to the coding block coder 1010 for use in generating residuals. The predictor 1070 may perform prediction search operations according to intra mode coding, and uni-predictive, bi-predictive, and/or multi-hypothesis inter mode coding. For intra mode coding, the predictor 1070 may search from among coding block data from the same frame as the coding block being coded that provides the closest match to the input coding block. For inter mode coding, the predictor 1070 may search from among coding block data of other previously coded frames stored in the reference picture buffer 1050 that provides a match to the input coding block. From among the predictions generated according to the various modes, the predictor 1070 may select a mode that achieves the lowest distortion when video is decoded given a target bitrate. Exceptions may arise when coding modes are selected to satisfy other policies to which the coding system 1000 adheres, such as satisfying a particular channel behavior, or supporting random access or data refresh policies.

When performing prediction searches within virtual reference frames stored in the virtual reference frame buffer 1064, the predictor 1070 may perform direct motion projection and temporal motion projection as described hereinabove.

The controller 1080 may control overall operation of the coding system 1000. The controller 1080 may select operational parameters for the coding block coder 1010 and the predictor 1070 based on analyses of input coding blocks and also external constraints, such as coding bitrate targets and other operational parameters. The controller 1080 may determine how to represent those selections in coded video data that is output from the system 1000. The controller 1080 also may select between different modes of operation by which the system may generate reference images and may include metadata identifying the modes selected for each portion of coded data.

During operation, the controller 1080 may revise operational parameters of the quantizer 1016 and the transform unit 1015 at different granularities of image data, either on a per coding block basis or on a larger granularity (for example, per frame, per slice, per largest coding unit ("LCU") or Coding Tree Unit (CTU), or another region). In an aspect, the quantization parameters may be revised on a per-pixel basis within a coded frame.

Additionally, as discussed, the controller 1080 may control operation of the in-loop filter 1040 and the prediction unit 1070. Such control may include, for the prediction unit 1070, mode selection (lambda, modes to be tested, search windows, distortion strategies, etc.), and, for the in-loop filter 1040, selection of filter parameters, reordering parameters, weighted prediction, etc.

Figure 11:
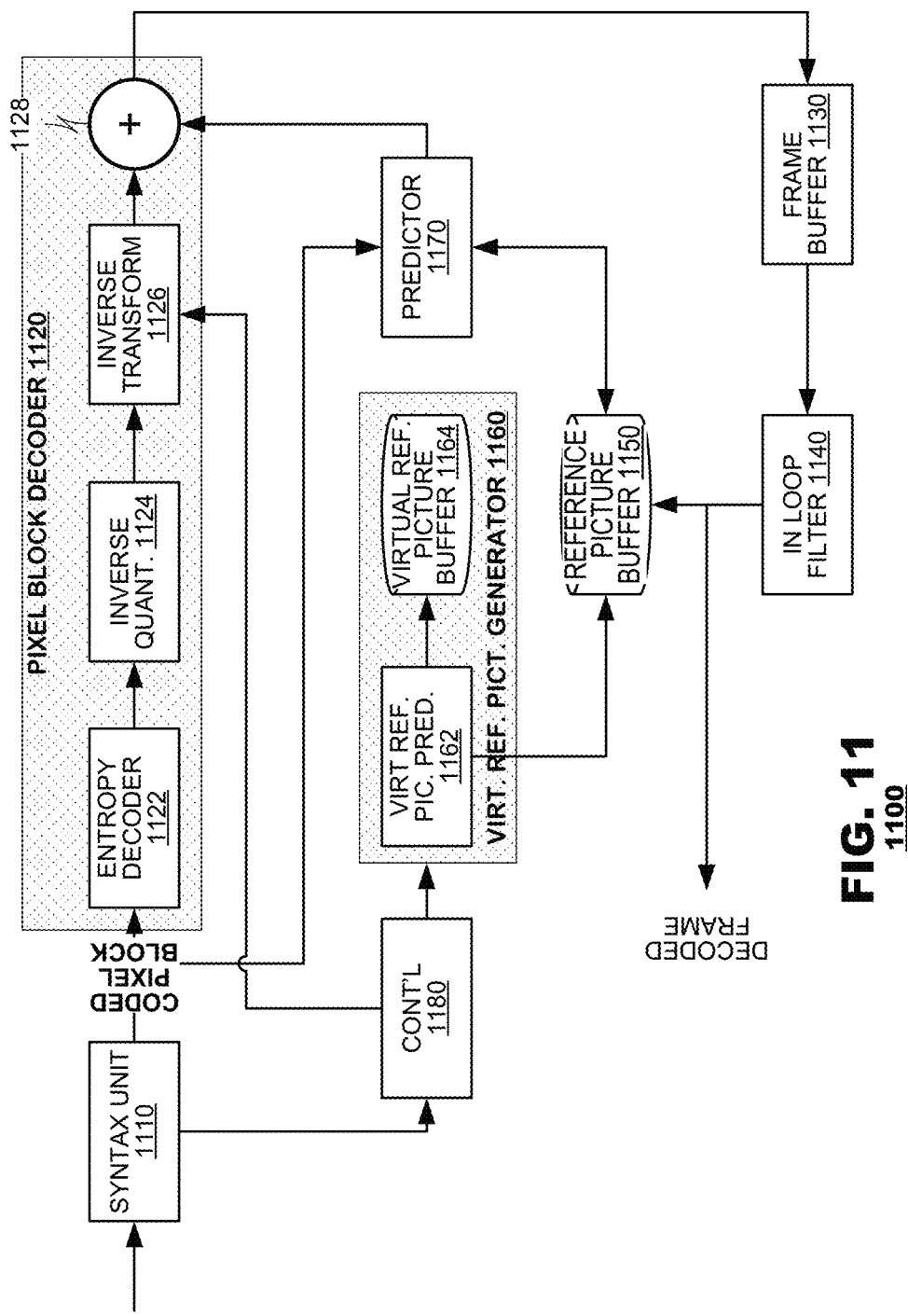
FIG. 11 is a functional block diagram of a decoding system according to an embodiment of the present disclosure.

FIG. 11 is a functional block diagram of a decoding system 1100 according to an aspect of the present disclosure. The decoding system 1100 may find application as a video decoder 422, 414 (FIG. 4) for exchange of coded video. The decoding system 1100 may include a syntax unit 1110, a coding block decoder 1120, a frame buffer 1130, an in-loop filter 1140, a reference picture buffer 1150, a virtual reference picture generator 1160, a predictor 1170, and a controller 1180.

The syntax unit 1110 may receive a coded video data stream and may parse the coded data into its constituent parts. Data representing coding parameters may be furnished to the controller 1180, while data representing coded residuals (the data output by the coding block coder 1010 of FIG. 10) may be furnished to the coding block decoder 1120. The predictor 1170 may generate a prediction block from reference frame data available in the reference picture buffer 1150 or the virtual reference picture generator 1160 as determined by coding parameter data provided in the coded video. The predictor 1170 may supply the prediction block to the coding block decoder 1120.

The coding block decoder 1120 may invert coding operations applied by the coding block coder 1010 (FIG. 10). The frame buffer 1130 may create a reconstructed frame from decoded coding blocks output by the coding block decoder 1120. The in-loop filter 1140 may filter the reconstructed frame data. The filtered frames may be output from the decoding system 1100. Filtered frames that are designated to serve as reference frames also may be stored in the reference picture buffer 1150.

The coding block decoder 1120 may include an entropy decoder 1122, a dequantizer 1124, an inverse transform unit 1126, and an adder 1128. The entropy decoder 1122 may perform entropy decoding to invert processes performed by the entropy coder 1010 (FIG. 10). The dequantizer 1124 may invert operations of the quantizer 1016 of the coding block coder 1010 (FIG. 10). Similarly, the inverse transform unit 1126 may invert operations of the transform unit 1010 (FIG. 10). They may use the quantization parameters and transform modes that are identified by the encoder either expressly or impliedly. Because quantization is likely to truncate data, the coding blocks recovered by the dequantizer 1124 likely will possess coding errors when compared to the input coding blocks s presented to the coding block coder 1010 of the encoder (FIG. 10).

The adder 1128 may invert operations performed by the subtractor 1010 (FIG. 10). It may receive a prediction coding block from the predictor 1170 as determined by prediction references in the coded video data stream. The adder 1128 may add the prediction coding block to reconstructed residual values output by the inverse transform unit 1126 and may output reconstructed coding block data.

As described, the frame buffer 1130 may assemble a reconstructed frame from the output of the coding block decoder 1120. The in-loop filter 1140 may perform various filtering operations on recovered coding block data as identified by the coded video data. For example, the in-loop filter 1140 may include a deblocking filter, a sample adaptive offset ("SAO") filter, and/or other types of in loop filters. In this manner, operation of the frame buffer 1130 and the in loop filter 1140 mimic operation of the counterpart frame buffer 1030 and in loop filter 1040 of the encoder 1000 (FIG. 10).

The reference picture buffer 1150 may store filtered frame data for use in later prediction of other coding blocks. The reference picture buffer 1150 may store decoded frames as it is coded for use in intra prediction. The reference picture buffer 1150 also may store decoded reference frames.

The virtual reference picture generator 1160 may generate virtual reference frames. The virtual reference picture generator 1160 may include a virtual reference picture predictor 1162 and a virtual reference picture buffer 1164. The virtual reference picture predictor 1162 may generate the virtual reference frames from reference frames stored in the reference picture buffer 1150. The virtual reference picture buffer 1164 may store the virtual reference frames so generated for use in prediction by the predictor 1170.

When performing prediction searches within virtual reference frames stored in the virtual reference frame buffer 1164, the predictor 1170 may perform direct motion projection and temporal motion projection as described hereinabove.

As discussed, the predictor 1170 may supply the prediction blocks to the coding block decoder 1120 according to a coding mode identified in the coded video data. The predictor 1170 may supply predicted coding block data as determined by the prediction reference indicators supplied in the coded video data stream.

The controller 1180 may control overall operation of the coding system 1100. The controller 1180 may set operational parameters for the coding block decoder 1120 and the predictor 1170 based on parameters received in the coded video data stream. As is relevant to the present discussion, these operational parameters may include quantization parameters for the dequantizer 1124 and transform modes for the inverse transform unit 1126. As discussed, the received parameters may be set at various granularities of image data, for example, on a per coding block basis, a per frame basis, a per slice basis, a per LCU/CTU basis, or based on other types of regions defined for the input image.

Figure 12:
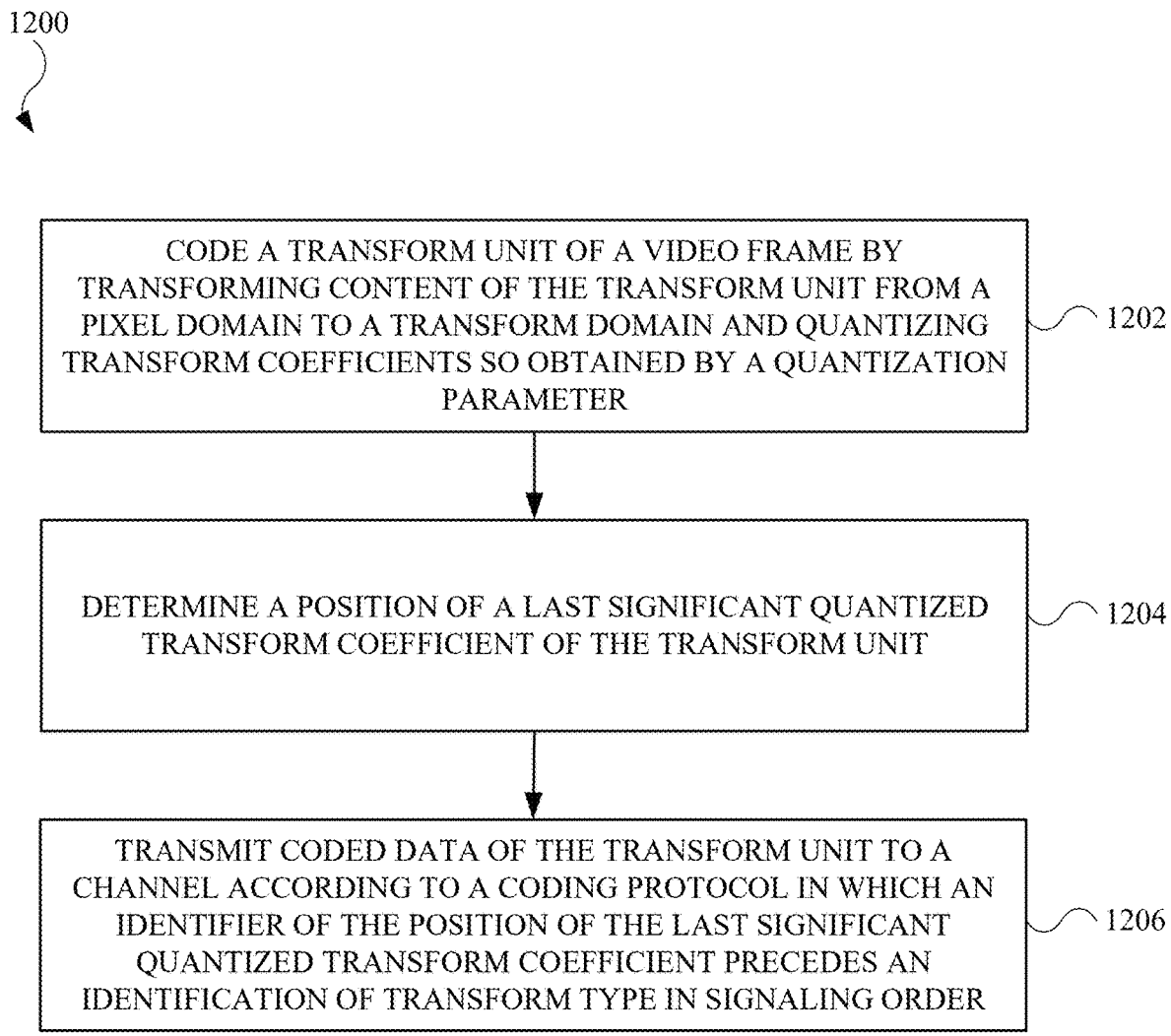
FIG. 12 is a flowchart showing an example of a process for video coding according to an embodiment of the present disclosure.

FIG. 12 is a flowchart showing an example of a process 1200 for video coding according to an embodiment of the present disclosure. At block 1202, a transform unit of a video frame by transforming content of the transform unit is coded from a pixel domain to a transform domain and quantizing transform coefficients so obtained by a quantization parameter. At block 1204, a position of a last significant quantized transform coefficient of the transform unit is determined. At block 1206, coded data of the transform unit to a channel is transmitted according to a coding protocol in which an identifier of the position of the last significant quantized transform coefficient precedes an identification of transform type in signaling order.

Figure 13:
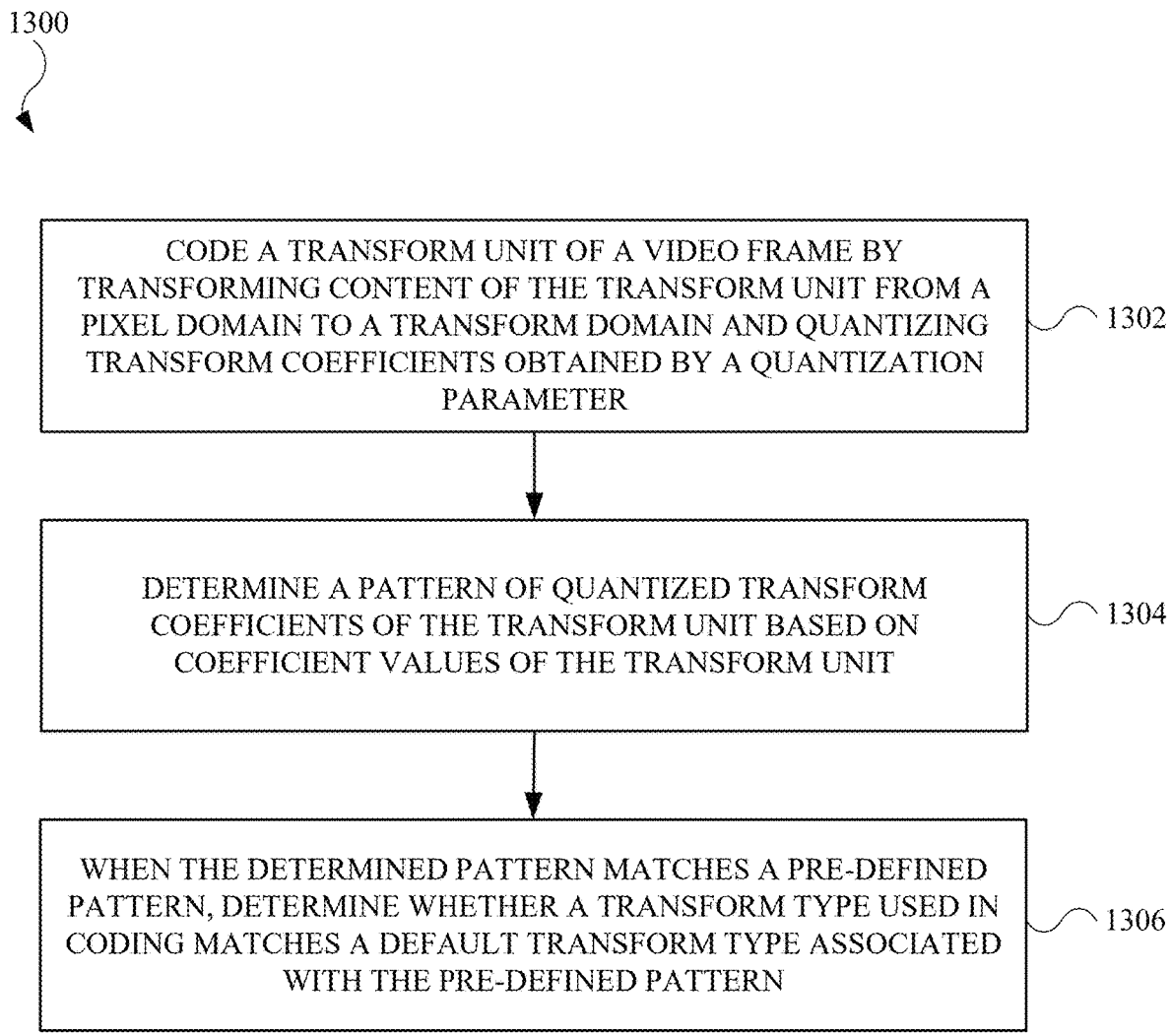
FIG. 13 is a flowchart showing an alternate example of a process for video coding according to an embodiment of the present disclosure.

FIG. 13 is a flowchart showing an alternate example of a process 1300 for video coding according to an embodiment of the present disclosure. At block 1302, a transform unit of a video frame is coded by transforming content of the transform unit from a pixel domain to a transform domain and quantizing transform coefficients so obtained by a quantization parameter. At block 1304, a position of a last significant quantized transform coefficient of the transform unit is determined. At block 1306, coded data of the transform unit to a channel is transmitted according to a coding protocol in which an identifier of the position of the last significant quantized transform coefficient precedes an identification of transform type in signaling order.

FIG. 14 is a flowchart showing an alternate example of a process 1400 for video coding according to an embodiment of the present disclosure. At block 1402, a transform unit of a video frame is coded by transforming content of the transform unit from a pixel domain to a transform domain and quantizing transform coefficients obtained by a quantization parameter. At block 1404, a pattern of quantized transform coefficients of the transform unit is determined based on coefficient values of the transform unit. At block 1406, when the determined pattern matches a pre-defined pattern, a determination is made whether a transform type used in coding matches a default transform type associated with the pre-defined pattern. At block 1408, when the determined pattern matches the pre-determined pattern, the transmitted coded data of the transform unit omits an identification of a transform type applied during the transforming.

Figure 15:
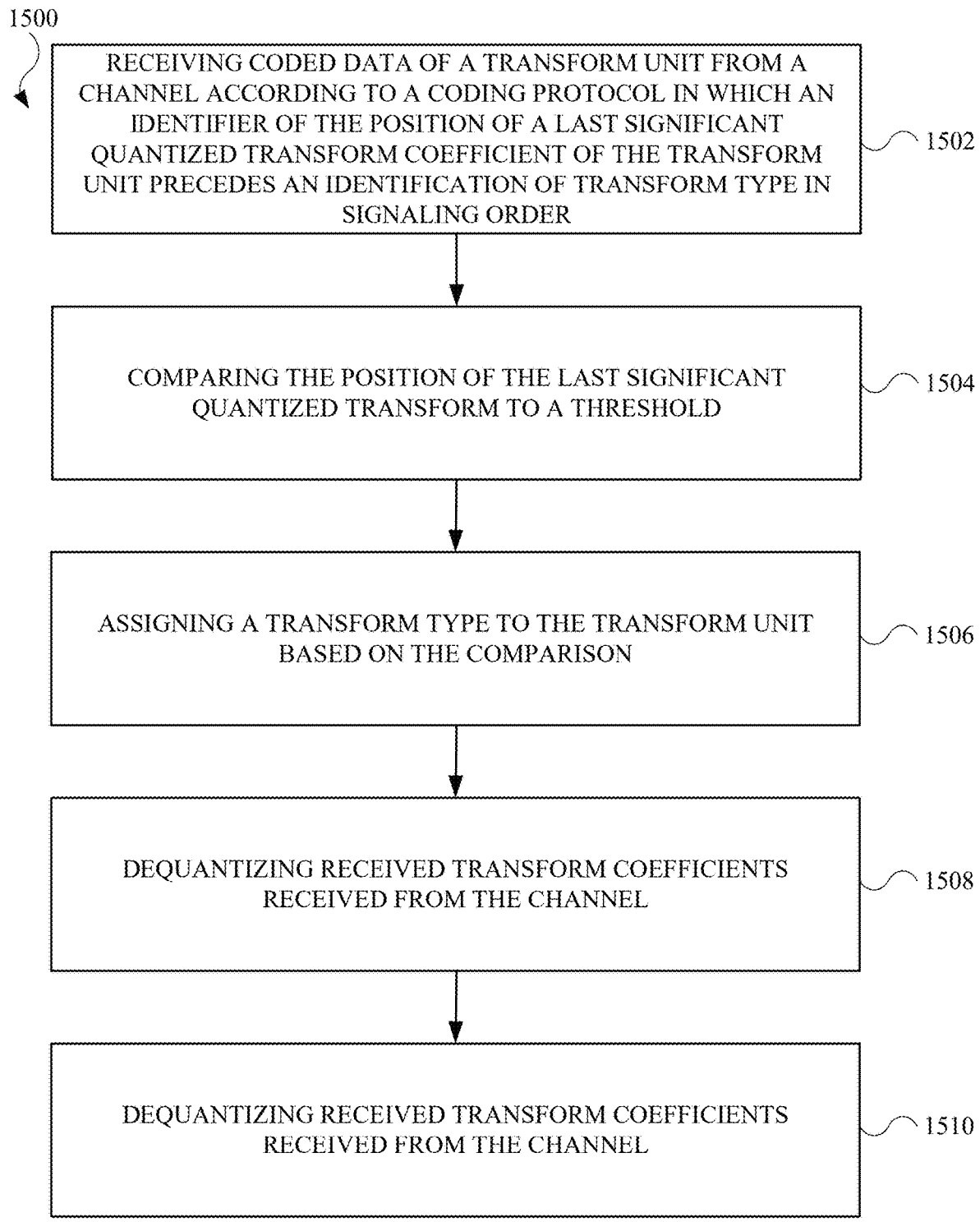
FIG. 15 is a flowchart showing an example of a process for video decoding according to an embodiment of the present disclosure.

FIG. 15 is a flowchart showing an example of a process 1500 for video decoding according to an embodiment of the present disclosure. At block 1502, coded data of a transform unit is received from a channel according to a coding protocol in which an identifier of the position of a last significant quantized transform coefficient of the transform unit precedes an identification of transform type in signaling order. At block 1504, the position of the last significant quantized transform is compared to a threshold. At block 1506, a transform type to the transform unit is assigned based on the comparison. At block 1508, received transform coefficients received from the channel are dequantized. At block 1510, the dequantized transform coefficients are transformed according to the default transform type.

Figure 16:
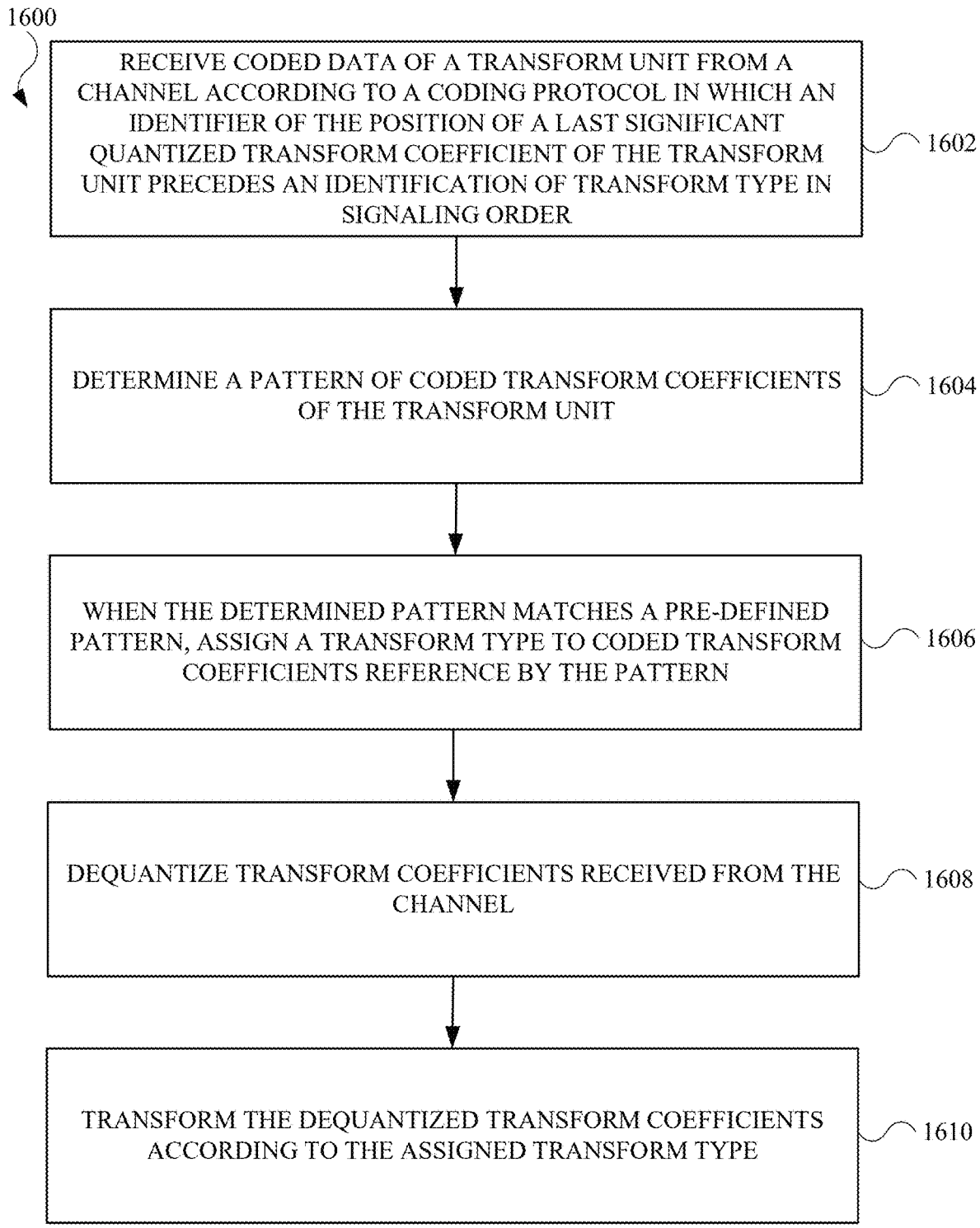
FIG. 16 is a flowchart showing an alternate example of a process for video coding according to an embodiment of the present disclosure.

FIG. 16 is a flowchart showing an alternate example of a process 1600 for video coding according to an embodiment of the present disclosure. At block 1602, coded data of a transform unit from a channel is received according to a coding protocol in which an identifier of the position of a last significant quantized transform coefficient of the transform unit precedes an identification of transform type in signaling order. At block 1604, a pattern of coded transform coefficients of the transform unit is determined. At block 1606, when the determined pattern matches a pre-defined pattern, a transform type is assigned to coded transform coefficients reference by the pattern. At block 1608, coefficients received from the channel are dequantized. At block 1610, the dequantized transform coefficients are transformed according to the assigned transform type.

Figure 17:
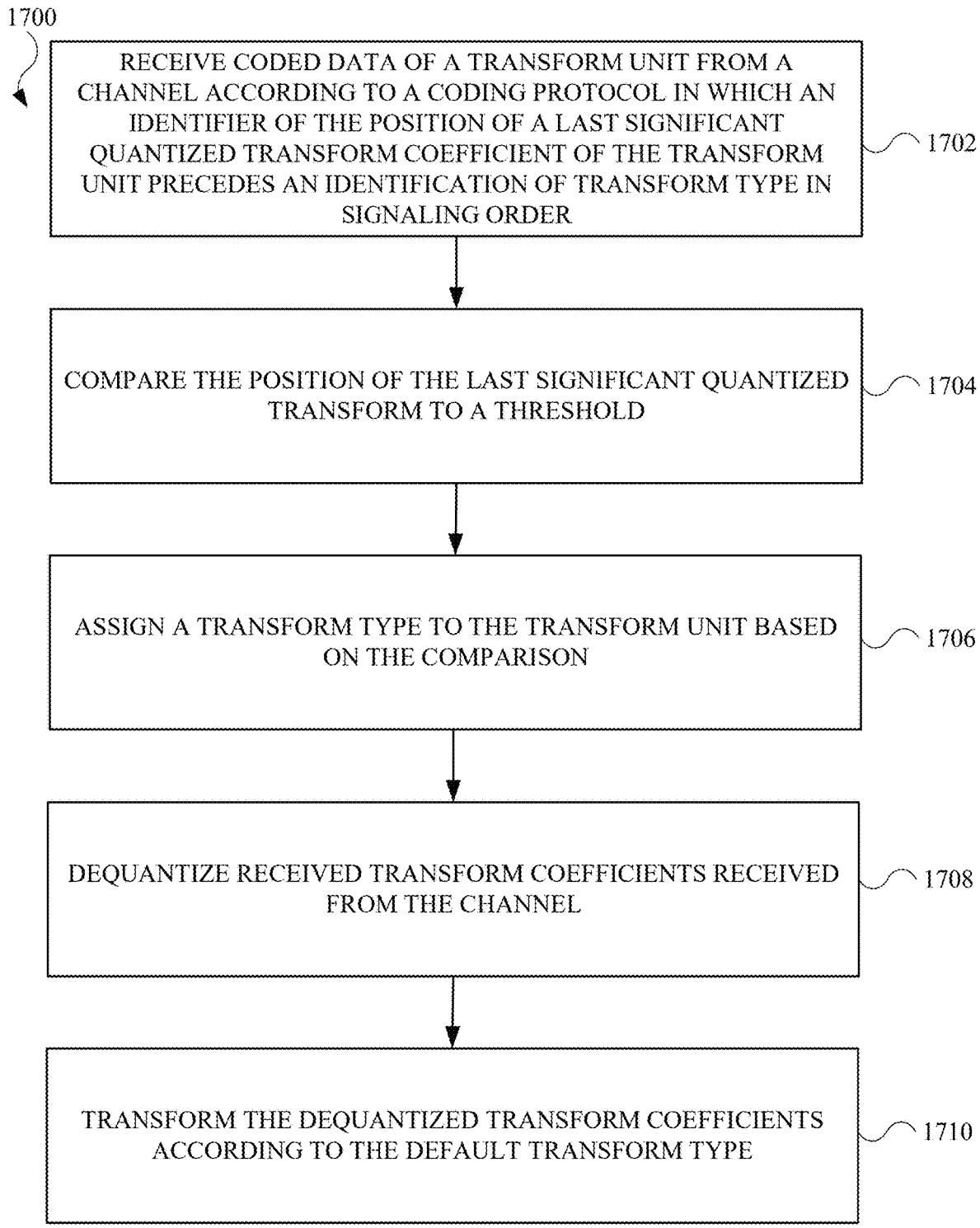
FIG. 17 is a flowchart showing an alternate example of a process for video decoding according to an embodiment of the present disclosure.

FIG. 17 is a flowchart showing an alternate example of a process 1700 for video decoding according to an embodiment of the present disclosure. At block 1702, coded data of a transform unit is received from a channel according to a coding protocol in which an identifier of the position of a last significant quantized transform coefficient of the transform unit precedes an identification of transform type in signaling order. At block 1704, the position of the last significant quantized transform is compared to a threshold. At block 1706, a transform type is assigned to the transform unit based on the comparison. At block 1708, received transform coefficients received from the channel are dequantized. At block 1710, the dequantized transform coefficients are transformed according to the default transform type.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically are stored in physical storage media such as electronic-, magnetic-, and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A video decoding method comprising:
   receiving coded data of a transform unit from a channel according to a coding protocol in which an identifier of a position of a last significant quantized transform coefficient of the transform unit precedes an identification of transform type in signaling order;
   comparing the position of the last significant quantized transform to a threshold;
   assigning a transform type to the transform unit based on the comparison, wherein the assigned transform type is inferred from i) multiple reference line data received from the channel or ii) angle delta offset data received from the channel;
   dequantizing received transform coefficients received from the channel; and
   transforming the dequantized transform coefficients according to a default transform type.

2. The method of claim 1, wherein the position is identified by its scan position within the transform unit.

3. The method of claim 1, wherein the position is identified by its x, y coordinate within the transform unit.

4. The method of claim 1, wherein when the comparison indicates an implied signaling condition is satisfied, the assigned transform type is the default transform type determined by a governing coding protocol.

5. The method of claim 1, wherein the assigned transform type is identified in a coding unit level of the coding protocol.

6. The method of claim 1, wherein the assigned transform type is inferred from a prediction mode of the transform unit.

7. The method of claim 1, further comprising:
   determining if a transform type identifier is present in the received data representing the coded transform unit,
   if the transform type identifier is not present in the received data of the coded transform unit, determining one of multiple position ranges to which the position identifier belongs, and determining the coded transform unit's transform type from the determined range.

8. The method of claim 1, wherein the comparison determines that the position is less than the threshold and, if so, assigns the transform type as a two-dimensional transform.

9. The method of claim 1, wherein the comparison determines that the position is less than the threshold and, if so, assigns the transform type from a two-member set binary symbol received from a channel.

10. The method of claim 1, wherein the comparison determines that the position is greater than the threshold and, if so, assigns the transform type as an identity transform.

11. The method of claim 1, wherein the comparison
    determines whether the position is between first and second thresholds and,
    if so, compares a transform type received in the channel to an array of candidate transform types, the array being smaller than an entirety of transform types supported by a governing coding protocol, and
    selects one of the candidate transform types based on the transform type comparison.

12. The video decoding method of claim 1, wherein the coding protocol supports coding of transform units in a quadtree representation, and assigned transform type is identified in a transform unit level at a higher level of the quadtree representation than the transform unit level in which the position identifier is received.

13. The method of claim 1, further comprising deriving a secondary transform type from a processing context of the coded transform unit.

14. A video decoder, comprising:
    a processing device,
    a memory storing program instructions that, when executed by the processing device, cause the processing device to decode coded video by:
      receiving coded data of a transform unit from a channel according to a coding protocol in which an identifier of a position of a last significant quantized transform coefficient of the transform unit precedes an identification of transform type in signaling order;
      comparing the position of the last significant quantized transform to a threshold;
      assigning a transform type to the transform unit based on the comparison, wherein the assigned transform type is inferred from i) multiple reference line data received from the channel or ii) angle delta offset data received from the channel;
      dequantizing received transform coefficients received from the channel;
      transforming the dequantized transform coefficients according to the default transform type;
      determining if a transform type identifier is present in the received data representing the coded transform unit; and
      if the transform type identifier is not present in the received data of the coded transform unit, determining one of multiple position ranges to which the position identifier belongs, and determining the coded transform unit's transform type from the determined range.

15. The decoder of claim 14, wherein the position is identified by its scan position within the transform unit.

16. The decoder of claim 14, wherein the position is identified by its x, y coordinate within the transform unit.

17. The decoder of claim 14, wherein when the comparison indicates an implied signaling condition is satisfied, the assigned transform type is the default transform type determined by a governing coding protocol.

18. The decoder of claim 14, wherein the assigned transform type is identified in a coding unit level of the coding protocol.

19. The decoder of claim 14, wherein the assigned transform type is inferred from a prediction mode of the transform unit.

* * * * *